(12) United States Patent
Lim

(10) Patent No.: US 9,989,809 B2
(45) Date of Patent: *Jun. 5, 2018

(54) CURVED LIQUID CRYSTAL DISPLAY AND METHOD OF MANUFACTURING THE SAME

(71) Applicant: Samsung Display Co. Ltd., Yongin, Gyeonggi-do (KR)

(72) Inventor: Ho Lim, Suwon-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 176 days.

This patent is subject to a terminal disclaimer.

(21) Appl. No.: 15/048,442

(22) Filed: Feb. 19, 2016

(65) Prior Publication Data
US 2017/0045783 A1   Feb. 16, 2017

(30) Foreign Application Priority Data

Aug. 11, 2015   (KR) .................. 10-2015-0113234

(51) Int. Cl.
  *G02F 1/1337* (2006.01)
  *C09K 19/56* (2006.01)
(52) U.S. Cl.
  CPC ........ *G02F 1/133711* (2013.01); *C09K 19/56* (2013.01); *G02F 1/133788* (2013.01); *G02F 2001/133726* (2013.01); *G02F 2001/133742* (2013.01); *Y10T 428/10* (2015.01); *Y10T 428/1005* (2015.01)
(58) Field of Classification Search
  CPC ......... G02F 1/133711; G02F 1/133788; G02F 1/13378; G02F 1/1337; G02F 1/1341; G02F 2001/133715; G02F 2001/133726; G02F 2001/133742; C09K 19/3809; C09K 19/3814; C09K 19/3828; C09K 19/56; Y10T 428/10; Y10T 428/1005
  USPC .... 428/1.1, 1.2; 349/93, 123, 127, 135, 191; 438/30
  See application file for complete search history.

(56) References Cited

U.S. PATENT DOCUMENTS

| | | |
|---|---|---|
| 2015/0018556 A1 | 1/2015 | Sobral et al. |
| 2015/0185560 A1 | 7/2015 | Lim |
| 2015/0293408 A1 | 10/2015 | Lim et al. |
| 2015/0362803 A1 | 12/2015 | Ahn et al. |
| 2016/0032190 A1 | 2/2016 | Lim et al. |

FOREIGN PATENT DOCUMENTS

| | | |
|---|---|---|
| KR | 100254283 | 2/2000 |
| KR | 101424460 | 7/2014 |
| KR | 101425772 | 7/2014 |
| KR | 1020150008837 | 1/2015 |
| KR | 1020150012093 | 2/2015 |
| KR | 1020150078514 | 7/2015 |

(Continued)

*Primary Examiner* — Ruiyun Zhang
(74) *Attorney, Agent, or Firm* — Cantor Colburn LLP

(57) ABSTRACT

A curved liquid crystal display includes a first curved substrate; a second curved substrate facing the first curved substrate; a liquid crystal layer disposed between the first curved substrate and the second curved substrate; a first curved liquid crystal alignment layer disposed between the liquid crystal layer and the first curved substrate and including vertical alignment functional groups; and a second curved liquid crystal alignment layer disposed between the liquid crystal layer and the second curved substrate.

20 Claims, 9 Drawing Sheets

(56) References Cited

FOREIGN PATENT DOCUMENTS

| KR | 1020150118659 | 10/2015 |
| KR | 1020150142768 | 12/2015 |
| KR | 1020160047029 | 5/2016 |
| KR | 1020160089951 A | 7/2016 |

CURVED LIQUID CRYSTAL DISPLAY AND METHOD OF MANUFACTURING THE SAME

This application claims priority to Korean Patent Application No. 10-2015-0113234, filed on Aug. 11, 2015, and all the benefits accruing therefrom under 35 U.S.C. § 119, the content of which in its entirety is herein incorporated by reference.

BACKGROUND

1. Field of the Invention

The present invention relates to a curved liquid crystal display and a method of manufacturing the same.

2. Description of the Related Art

A liquid crystal display is a type of flat panel display that is widely used. A liquid crystal display includes two substrates on which field generating electrodes, such as a pixel electrode and a common electrode are formed, and a liquid crystal layer interposed between the two substrates.

A liquid crystal display displays an image when a voltage is applied to field generating electrodes to produce an electric field in the liquid crystal layer, whereby the alignment direction of liquid crystals in the liquid crystal layer is determined and the polarization of incident light is controlled.

A liquid crystal display may have a large screen size when used as a display device for a television receiver. As the size of the liquid crystal display is, the quality of the images displayed at the center of the screen and at opposite ends of the screen may appear different from each other when viewed by a viewer.

In order to compensate for the difference in appearance, a liquid crystal display may be curved to have a concave or convex shape. A curved liquid crystal display may be provided in a portrait form, which is curved in a longitudinal direction and has a length greater than its width when viewed by viewers, or in a landscape form, which is curved in a transverse direction and has a length shorter than its width.

SUMMARY

Aspects of the invention provide a curved liquid crystal display having increased light transmittance and a method of manufacturing the same.

Aspects of the invention also provide a curved liquid crystal display, which may prevent the generation of unnecessary patterns or stains due to the use of a curved panel, and a method of manufacturing the same.

However, aspects of the invention are not restricted to the one set forth herein. The above and other aspects of the invention will become more apparent to one of ordinary skill in the art to which the present invention pertains by referencing the detailed description given below.

According to an exemplary embodiment, a curved liquid crystal display includes a first curved substrate; a second curved substrate facing the first curved substrate; a liquid crystal layer disposed between the first curved substrate and the second curved substrate; a first curved liquid crystal alignment layer disposed between the liquid crystal layer and the first curved substrate and including at least one vertical alignment functional group represented by Chemical Formulae 1 to 5 below; and a second curved liquid crystal alignment layer disposed between the liquid crystal layer and the second curved substrate:

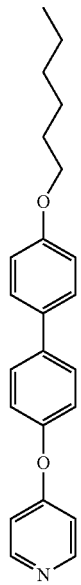

Chemical Formula 1>

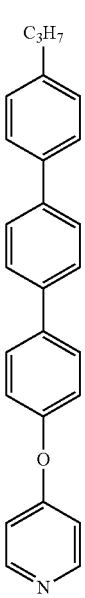

Chemical Formula 2>

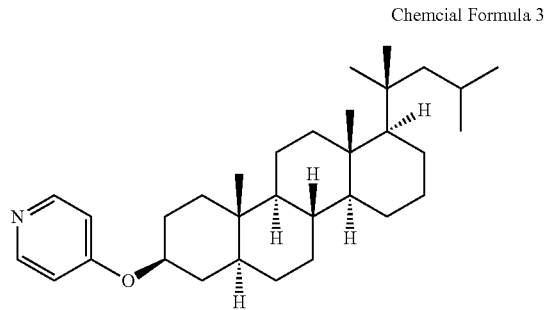

Chemcial Formula 3

Chemical Formula 4

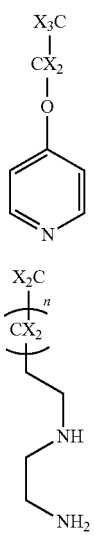

Chemical Formula 5 wherein in Chemical Formulae 4 and 5, X is H, F, Br, I, OH, $C_3H_7$, $NH_2$, or CN, and in Chemical Formula 5, n is a natural number of 1 to 20.

In an exemplary embodiment, the second curved liquid crystal alignment layer may contain a polymerization initiator.

In an exemplary embodiment, the first curved liquid crystal alignment layer may contain no polymerization initiator.

In an exemplary embodiment, the first curved liquid crystal alignment layer may further include at least one vertical alignment functional group represented by Chemical Formulae 6 to 19 below.

Chemical Formula 6

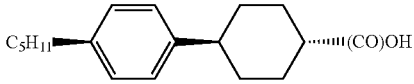

Chemical Formula 7

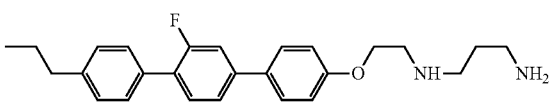

Chemical Formula 8

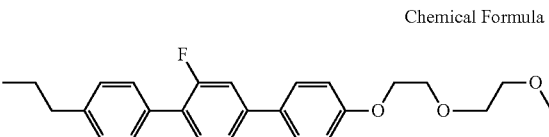

Chemical Formula 9

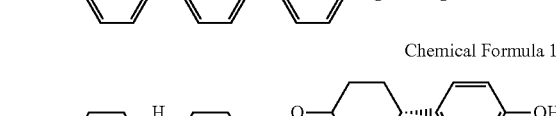

Chemical Formula 10

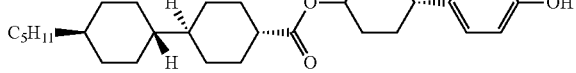

Chemical Formula 11

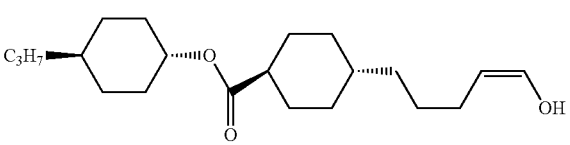

Chemical Formula 12

Chemical Formula 13

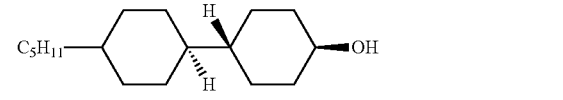

Chemical Formula 14

Chemical Formula 15

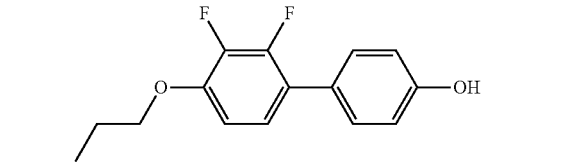

Chemical Formula 16

Chemical Formula 17

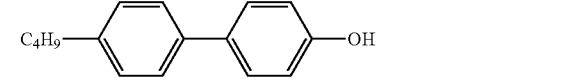

Chemical Formula 18

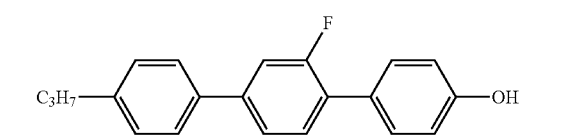

Chemical Formula 19

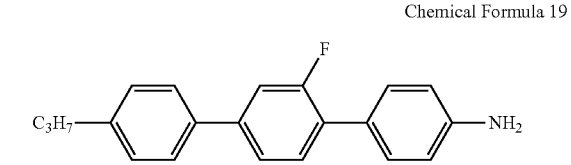

In an exemplary embodiment, the second curved liquid crystal alignment layer may include a repeating unit as represented by Chemical Formulae 29 and 30 below:

Chemical Formula 29

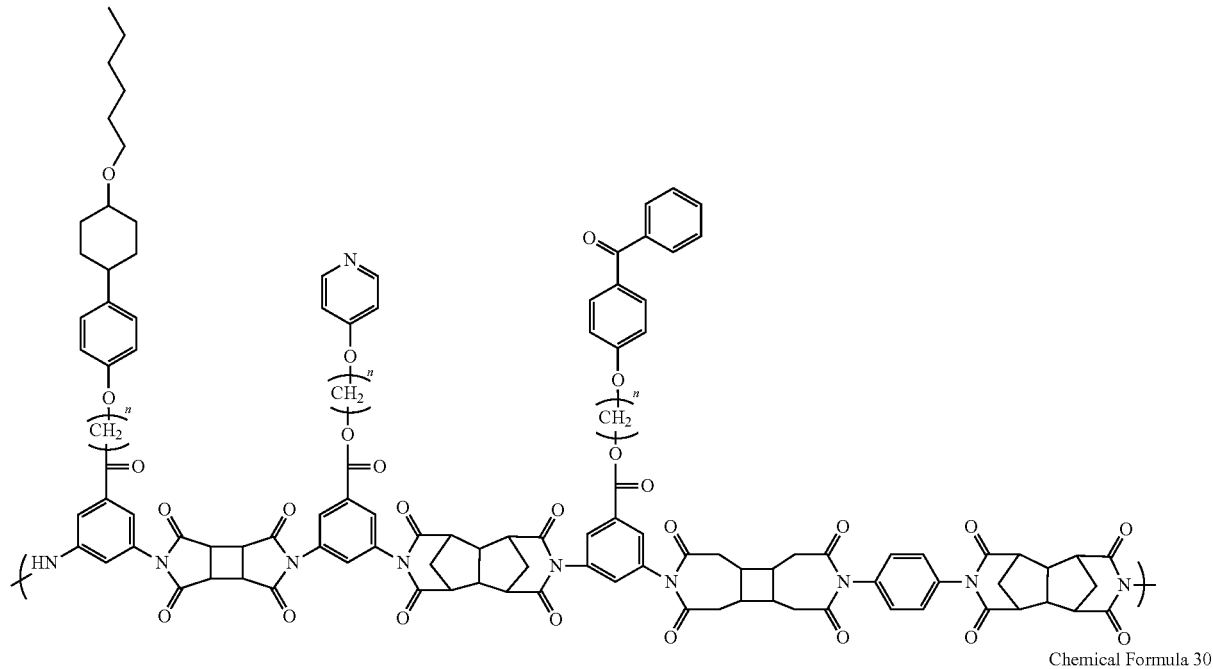

Chemical Formula 30

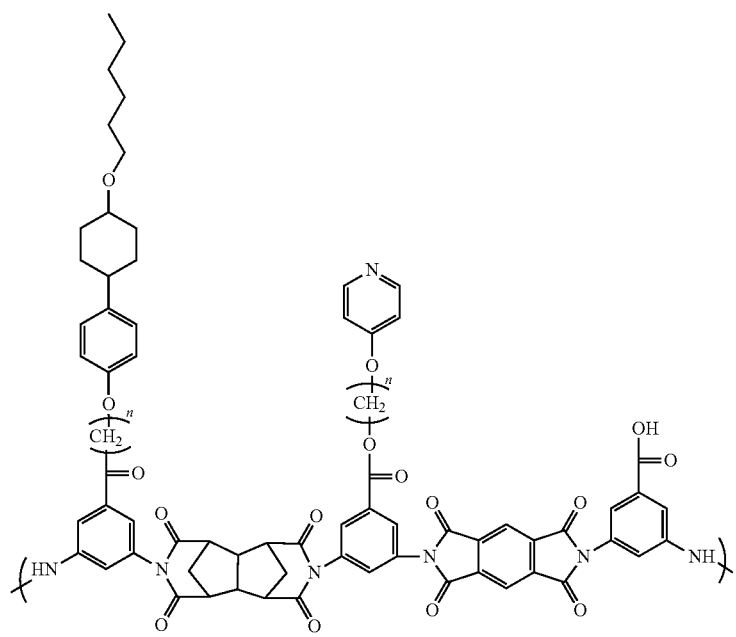

wherein in Chemical Formulae 29 and 30, each n is independently a natural number of 1 to 20.

In an exemplary embodiment, the second curved liquid crystal alignment layer may include a reactive mesogen and have a higher reactive mesogen content than the first curved liquid crystal alignment layer.

The curved liquid crystal display, the second curved liquid crystal alignment layer may have a multilayer structure comprising a 2-1$^{st}$ curved liquid crystal alignment layer and a 2-2$^{nd}$ curved liquid crystal alignment layer, and the 2-2$^{nd}$ curved liquid crystal alignment layer may have a higher reactive mesogen content than the 2-1$^{st}$ curved liquid crystal alignment layer.

The curved liquid crystal display, the liquid crystal layer may comprise a first liquid crystal molecule having negative dielectric anisotropy aligned on a surface of the first curved liquid crystal alignment layer, and a second liquid crystal molecule aligned on a surface of the second curved liquid crystal alignment layer, and the first liquid crystal molecule may be vertically aligned compared to the second liquid crystal molecule when an electric field is not applied.

In an exemplary embodiment, the curved liquid crystal display may further includes a patternless electrode disposed between the first curved substrate and the first curved liquid crystal alignment layer and having no slit pattern; and a pattern electrode disposed between the second curved liquid crystal alignment layer and the second curved substrate and having a slit pattern.

According to an exemplary embodiment, a method of manufacturing a curved liquid crystal display includes, preparing a first flat substrate and a second flat substrate facing each other; forming a second flat liquid crystal alignment layer on a surface of the second flat substrate that faces the first flat substrate; injecting a liquid crystal between the first flat substrate and the second flat substrate; radiating ultraviolet (UV) light toward at least one of the first flat substrate and the second flat substrate when an electric field is applied; and curving the first flat substrate and the second flat substrate, wherein the liquid crystal layer includes at least one of vertical alignment functional groups represented by Chemical Formulae 1 to 5 below:

Chemical Formula 1>

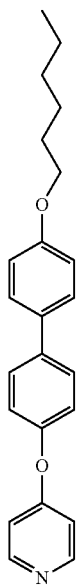

Chemical Formula 2>

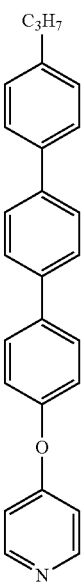

Chemical Formula 3

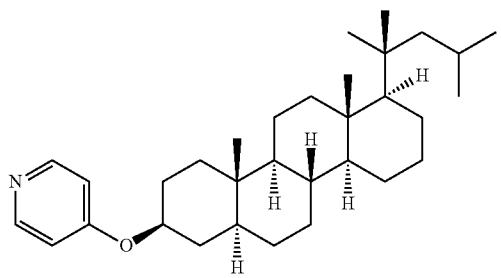

Chemical Formula 4

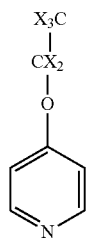

Chemical Formula 5

[structure with $X_2C$ and $CX_2$ repeating unit n, ending in NH-CH2CH2-NH2]

wherein in Chemical Formulae 4 and 5, X is H, F, Br, I, OH, $C_3H_7$, $NH_2$, or CN, and in Chemical Formula 5, n is a natural number of 1 to 20.

In an exemplary embodiment, the liquid crystal layer may further include at least one vertical alignment functional group represented by Chemical Formulae 6 to 19 below.

Chemical Formula 6

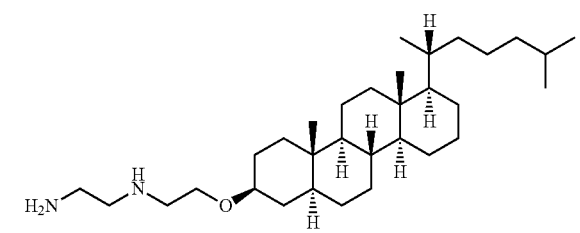

Chemical Formula 7

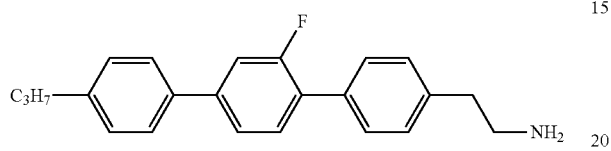

Chemical Formula 8

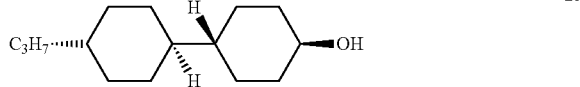

Chemical Formula 9

Chemical Formula 10

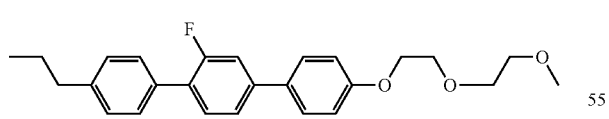

Chemical Formula 11

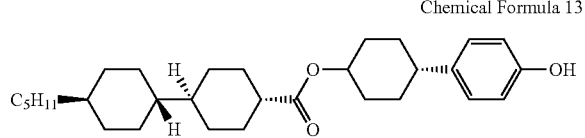

Chemical Formula 12

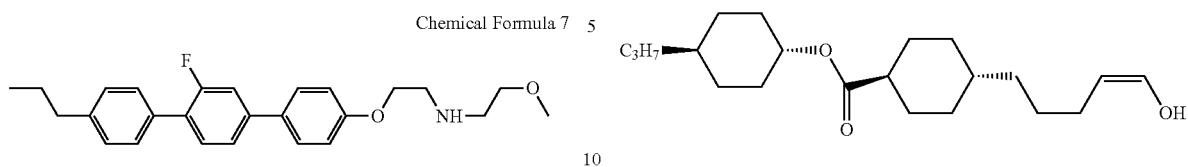

Chemical Formula 13

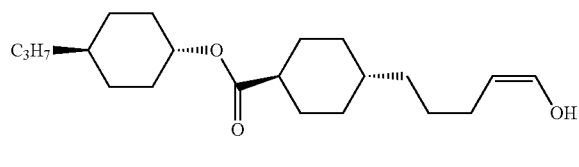

Chemical Formula 14

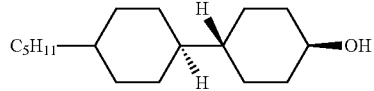

Chemical Formula 15

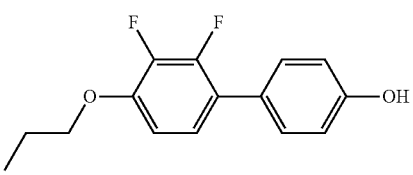

Chemical Formula 16

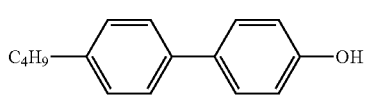

Chemical Formula 17

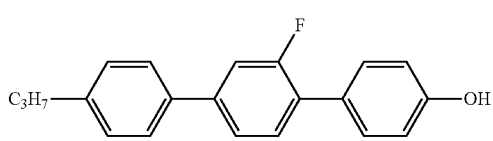

Chemical Formula 18

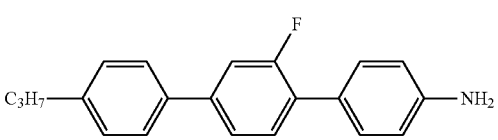

Chemical Formula 19

In an exemplary embodiment, in the injecting of the liquid crystal, the vertical alignment functional group may enable a first flat liquid crystal alignment layer to be formed on a surface of the first flat substrate that faces the second flat substrate.

In an exemplary embodiment, the second flat liquid crystal alignment layer may include a polymerization initiator.

The method of manufacturing curved liquid crystal display, the second flat liquid crystal alignment layer may include a repeating unit as represented by Chemical Formulae 29 and 30 below:

Chemical Formula 29

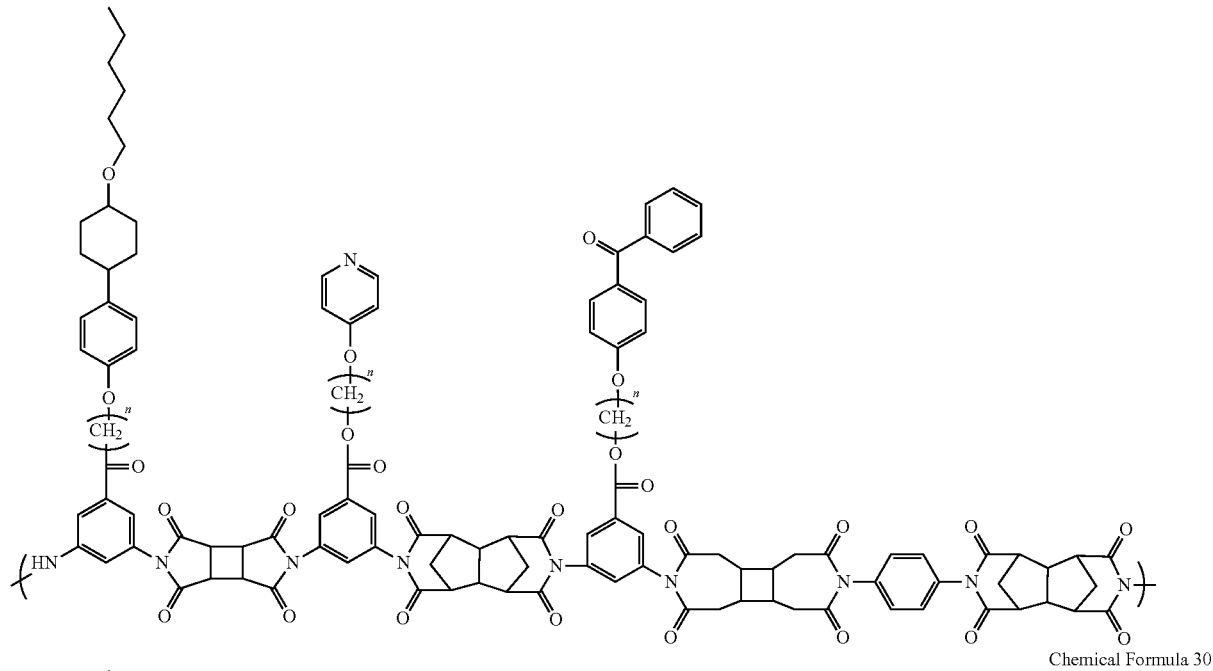

Chemical Formula 30

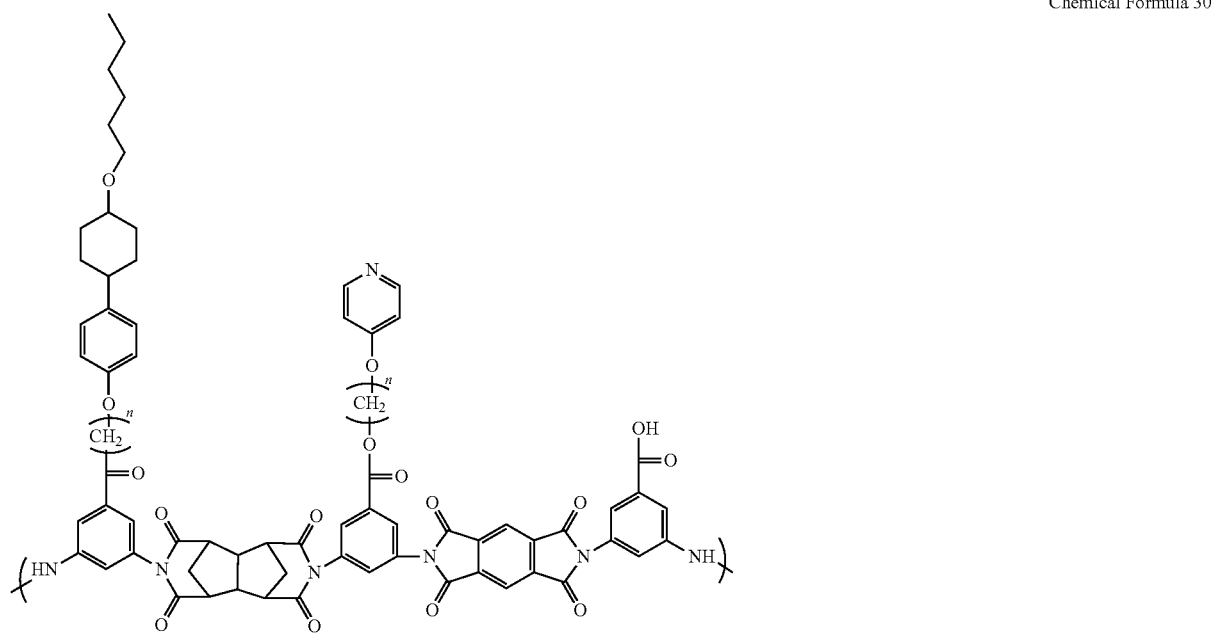

wherein in Chemical Formulae 29 and 30, each n is independently a natural number of 1 to 20.

In an exemplary embodiment, at least one of the liquid crystal layer and the second flat liquid crystal alignment layer may further include a reactive mesogen.

The method of manufacturing curved liquid crystal display, in the radiating the UV light, the second flat liquid crystal alignment layer may be formed into a multilayer structure comprising a 2-$1^{st}$ flat liquid crystal alignment layer and a 2-$2^{nd}$ flat liquid crystal alignment layer having higher reactive mesogen content than the 2-$1^{st}$ flat liquid crystal alignment layer.

In an exemplary embodiment, the liquid crystal layer may include a first liquid crystal molecule having negative dielectric anisotropy aligned on a surface of the first flat liquid crystal alignment layer, and a second liquid crystal molecule aligned on a surface of the second flat liquid crystal alignment layer, and the first liquid crystal molecule is vertically aligned compared to the second liquid crystal molecule when the applied electric field is removed after the radiating the UV light.

In an exemplary embodiment, the method of manufacturing curved liquid crystal display may further include forming a patternless electrode disposed between the first flat substrate and the first flat liquid crystal alignment layer, the patternless electrode having no slit pattern; and forming a pattern electrode disposed between the second flat liquid crystal alignment layer and the second flat substrate, the pattern electrode having a slit pattern.

In an exemplary embodiment, the method of manufacturing curved liquid crystal display may further include radiating fluorescent UV light after the radiating of the UV light.

In an exemplary embodiment, the method of manufacturing curved liquid crystal display may further include annealing at least one of the first flat substrate and the second flat substrate using heat after the liquid crystal is injected.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION

Figure 1:
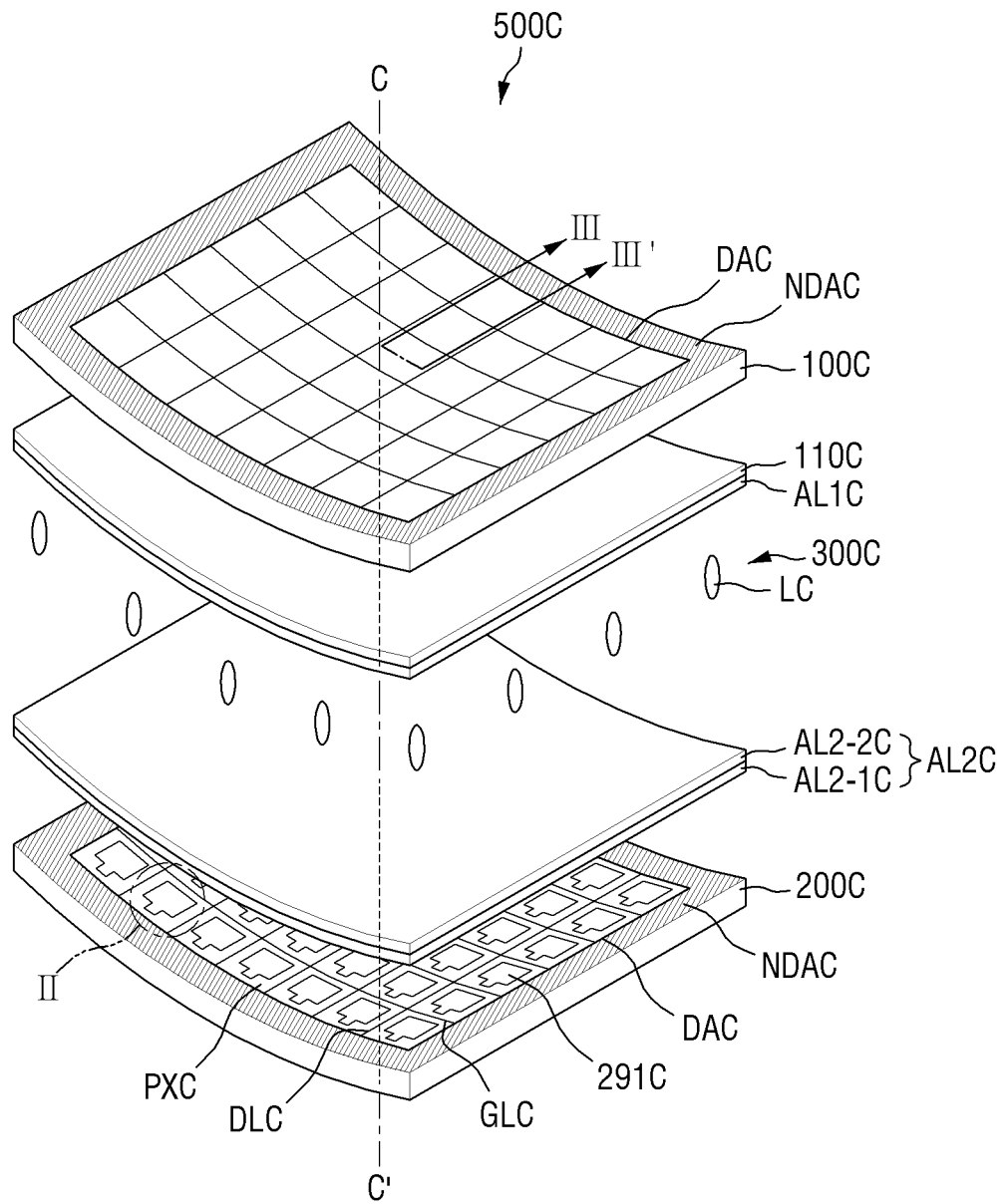
FIG. 1 is an exploded perspective view schematically showing an exemplary embodiment of a curved liquid crystal display.

Features of the inventive concept and methods of accomplishing the same may be understood more readily by reference to the following detailed description of preferred embodiments and the accompanying drawings.

The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the inventive concept will only be defined by the appended claims.

In the drawings, the thickness of layers and regions are exaggerated for clarity. It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other.

Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "bottom," "below," "lower," "under," "above," "upper," "top" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. "Or" means "and/or." It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value."

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments will be described in detail with reference to the attached drawings.

Figure 2:
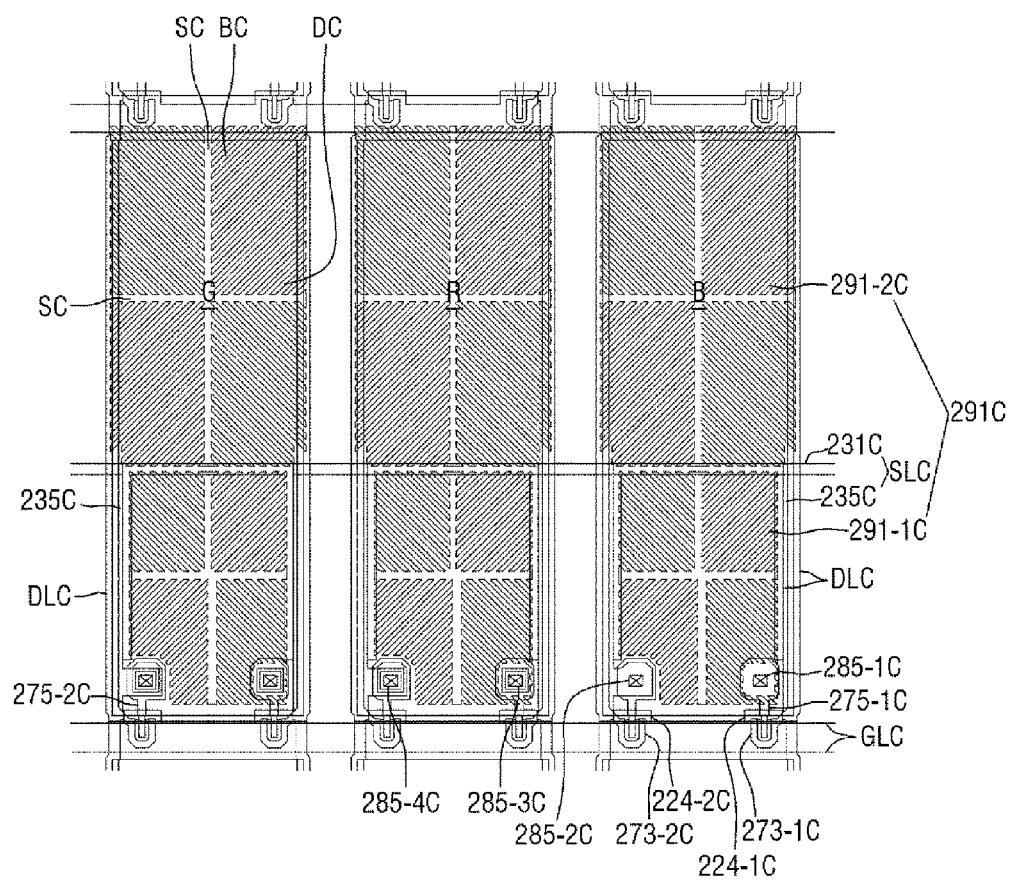
FIG. 2 is a schematic enlarged view of Part II in FIG. 1.

FIG. 1 is an exploded perspective view schematically showing an exemplary embodiment of a curved liquid crystal display 500C, and FIG. 2 is a schematic enlarged view of Part II of FIG. 1.

Referring to FIGS. 1 and 2, the exemplary curved liquid crystal display 500C includes a first curved substrate 100C, a second curved substrate 200C configured to face the first curved substrate 100C and spaced apart therefrom, and a liquid crystal layer 300C interposed between the first curved substrate 100C and the second curved substrate 200C.

The first and the second curved substrate 100C, 200C each include a display area DAC and a non-display area NDAC. The display area (DAC) is an area where an image is viewed, and the non-display area NDAC is an area where an image is not viewed. The outer periphery of the display area DAC is enclosed with the non-display area NDAC.

A common electrode 110C may be disposed between the first curved substrate 100C and the second curved substrate 200C, and may be a patternless electrode having no slit pattern. A pixel electrode 291C may be disposed between the second curved substrate 200C and the common electrode 110C, and may be a pattern electrode having a slit pattern.

The liquid crystal layer 300C may be disposed between the common electrode 110C and the pixel electrode 291C. The liquid crystal layer 300C may contain liquid crystal molecules LC having negative dielectric anisotropy. A first curved liquid crystal alignment layer AL1C may be disposed between the common electrode 110C and the liquid crystal layer 300C. A second curved liquid crystal alignment layer AL2C may be disposed between the pixel electrode 291C and the liquid crystal layer 300C.

The second curved substrate 200C may be a thin film transistor substrate. In the display area DAC of the second curved substrate 200C, a plurality of gate lines GLC extending in a first direction and a plurality of data lines DLC extending in a second direction perpendicular to the first direction may be formed. The pixel electrode 291C may be disposed at each of pixels PXC defined by the gate lines GLC and the data lines DLC.

The pixel electrode 291C may include sub-pixel electrodes 291-1C, 291-2C, which are spaced apart from each other. For example, individual sub-pixel electrodes 291-1C, 291-2C may have a rectangular shape. Individual sub-pixel electrodes 291-1C, 291-2C may be pattern electrodes having a slit pattern. Specifically, the slit pattern may be configured such that a dissection part DC may be disposed between a stem part SC and a branch part BC extending therefrom. The stem part SC may be provided in a cross (+) shaped form, and the branch part BC may be radially provided in a direction of about 45° from the stem part SC in cross (+) shaped form.

The gate lines GLC may include gate electrodes 224-1C, 224-2C protruding in the second direction from the gate lines GLC toward the pixel electrode 291C. The data lines DLC may include source electrodes 273-1C, 273-2C and drain electrodes 275-1C, 275-2C. The source electrodes 273-1C, 273-2C may be provided in a "U" shaped form by protruding from the data lines DLC. The drain electrodes 275-1C, 275-2C may be spaced apart from the source electrodes 273-1C, 273-2C.

The pixel electrode 291C may receive data voltage via the thin film transistor that is a switching device. The gate electrodes 224-1C, 224-2C, which are control terminals of the thin film transistor, may be electrically connected to the gate lines GLC. The source electrodes 273-1C, 273-2C, which are input terminals, may be electrically connected to the data lines DLC via contact holes 285-1C, 285-2C, 285-3C, 285-4C, and the drain electrodes 275-1C, 275-2C, which are output terminals, may be electrically connected to the pixel electrode 291C.

The pixel electrode 291C may produce an electric field together with the common electrode 110C, so that the alignment direction of the liquid crystal molecules LC of the liquid crystal layer 300C disposed therebetween may be controlled. The pixel electrode 291C may function to control the alignment direction of the d liquid crystal molecules LC through distortion of the electric field.

The thin film transistor substrate may be configured such that a base substrate (not shown), the gate electrodes 224-1C, 224-2C, a gate insulating film (not shown), a semiconductor layer (not shown), an ohmic contact layer (not shown), the source electrodes 273-1C, 273-2C, the drain electrodes 275-1C, 275-2C, a passivation layer (not shown), and an organic layer (not shown) are stacked. The base substrate may be made of a glass or polymer material The channel of the thin film transistor may be formed of a semiconductor layer (not shown). The semiconductor layer may be disposed so as to overlap the gate electrodes 224-1C, 224-2C. Individual source electrodes 273-1C, 273-2C and individual drain electrodes 275-1C, 275-2C may be spaced apart from each other on the basis of the semiconductor layer.

A sustain electrode line SLC may include a stem line 231C disposed substantially parallel to the gate lines GLC and a plurality of branch lines 235C extending from the stem line 231C. The sustain electrode line SLC may be omitted, or the shape and configuration thereof may be variously set.

The non-display area NDAC, which is positioned around the display area DAC, may be a light shielding area that encloses the outer periphery of the display area DAC. In the non-display area NDAC of the second curved substrate 200C, a driving part (not shown) for transmitting a gate driving signal and a data driving signal to each pixel PXC of the display area (DAC may be disposed. The gate lines GLC and the data lines DLC may extend from the display area DAC to the non-display area NDAC, and may thus be electrically connected to the driving part.

The first curved substrate 100C may be disposed to face the second curved substrate 200C. The common electrode 110C may be disposed on the second curved substrate 200C.

A color filter layer (not shown) may be formed in the area corresponding to each pixel PXC of the display area DAC, and may include a red color filter (R), a green color filter (G), and a blue color filter (B). The color filter layer may be included in either the first curved substrate 100C or the second curved substrate 200C. For example, when the first curved substrate 100C includes the color filter layer, the first curved substrate 100C may be configured such that a base substrate (not shown) made of glass or a polymer, the color filter layer (not shown), and an overcoat layer (not shown) are stacked. The overcoat layer may be a flat layer that covers the color filter layer. As such, the common electrode 110C may be disposed on the overcoat layer.

For example, when the second curved substrate 200C includes the color filter layer, the second curved substrate 200C may have a color-filter-on-array (COA) structure configured such that the color filter is formed on a transparent insulating substrate having the thin film transistor formed thereon. For instance, the color filter layer may be disposed between an organic layer (not shown) and a passivation layer (not shown) that covers the source electrodes 273-1C, 273-2C and the drain electrodes 275-1C, 275-2C.

A light shielding pattern layer (not shown) may be disposed at the boundaries of the color filters (R, G, B). The light shielding pattern layer may be included in either the first curved substrate 100C or the second curved substrate 200C. For example, the light shielding pattern layer (not shown) may be a black matrix.

Upon fabrication of the curved liquid crystal display 500C, misalignment between the first and the second curved substrate 100C, 200C may occur due to stress that is applied to each of the first and the second flat substrate in the course of curving a flat liquid crystal display. For example, when the flat liquid crystal display is curved, the first curved substrate 100C may be shifted leftward or rightward relative to the second curved substrate 200C. In this case, the configuration of the first curved substrate 100C and the second curved substrate 200C may be different from the preset configuration of the first flat substrate and the second flat substrate. The misalignment between the first curved substrate 100C and the second curved substrate 200C may deteriorate the display quality of the curved liquid crystal display 500C.

For example, when the first curved liquid crystal alignment layer AL1C and the second curved liquid crystal alignment layer AL2C each include a plurality of domains which differ in the alignment direction of the directors of liquid crystal molecules, misalignment occurs between the boundaries of the domains of the first curved liquid crystal alignment layer AL1C and the boundaries of the domains of the second curved liquid crystal alignment layer AL2C. This misalignment may cause interference or a conflict in the alignment direction between the first liquid crystal molecules, which are tilt-aligned on the surface of the first curved liquid crystal alignment layer AL1C, and the second liquid crystal molecules, which are tilt-aligned on the surface of the second curved liquid crystal alignment layer AL2C in a direction different from the first liquid crystal molecules. Thereby, the liquid crystal molecules positioned between the first and the second liquid crystal molecules are substantially vertically aligned, thus forming a texture. The texture may be viewed as a stain or dark area in the display area DAC of the curved liquid crystal display 500C, and as a result, the light transmittance of the curved liquid crystal display 500C may decrease.

Figure 3:
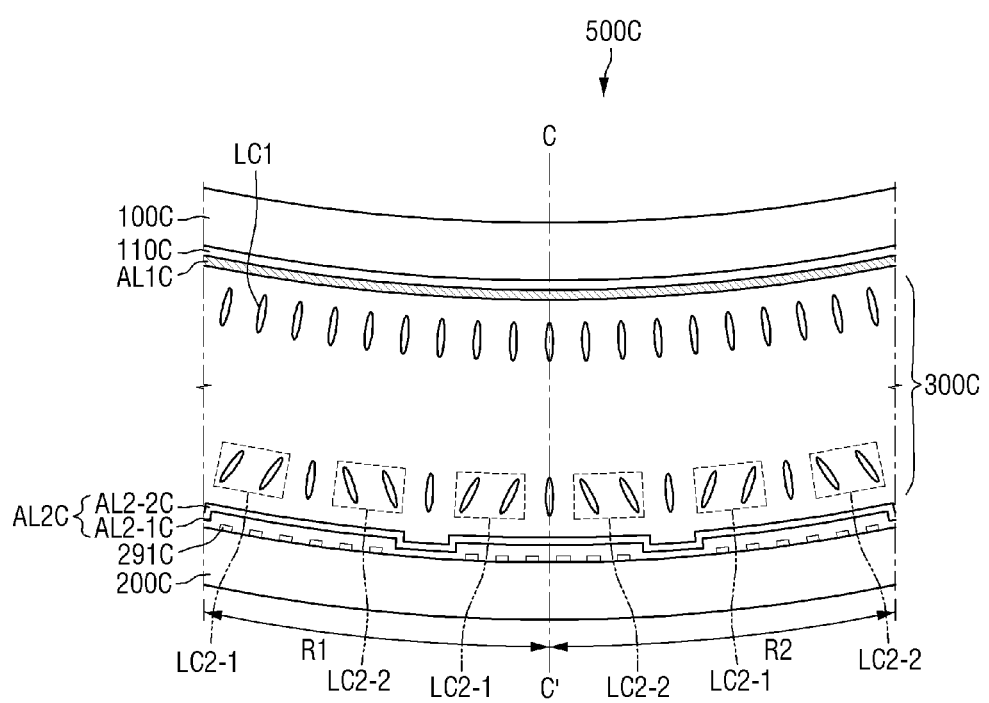
FIG. 3 is a schematic cross-sectional view taken along line III-III' of FIG. 1.

FIG. 3 is a schematic cross-sectional view taken along the line III-III' of FIG. 1. Below is a detailed description of an exemplary embodiment of the curved liquid crystal display 500C with reference to FIG. 3. FIG. 3 schematically shows the alignment of the liquid crystal molecules LC1, LC2-1, LC2-2 under the initial condition when an electric field is not applied to the curved liquid crystal display 500C.

As shown in FIG. 3, the first liquid crystal molecules LC1 may be aligned on the surface of the first curved liquid crystal alignment layer AL1C. The second liquid crystal molecules LC2-1, LC2-2 may be aligned on the surface of the second curved liquid crystal alignment layer AL2C. The first liquid crystal molecules LC1 may be relatively vertically aligned as compared to the second liquid crystal molecules LC2-1, LC2-2. Meanwhile, the second liquid crystal molecules LC2-1, LC2-2 may be relatively tilt-aligned as compared to the first liquid crystal molecules LC1.

Specifically, the second liquid crystal molecules LC2-1, LC2-2 may be arranged under conditions in which a predetermined pre-tilt is formed on the surface of the second curved liquid crystal alignment layer AL2C, while the first liquid crystal molecules LC1 may be arranged under conditions that a pre-tilt is not or is seldom achieved. That is, unlike the second liquid crystal molecules LC2-1, LC2-2, the first liquid crystal molecules LC1 are arranged under conditions in which only vertical alignment is substantially achieved. Thereby, even when misalignment occurs in the course of forming the first curved substrate 100C and the second curved substrate 200C, interference or conflict in the alignment directions may be prevented, and the formation of texture may also be prevented. Accordingly, a stain or dark area may be prevented from being viewed in the display area DAC of the curved liquid crystal display 500C, and light transmittance may not decrease.

In an embodiment, under the initial condition in which an electric field is not applied to the curved liquid crystal display 500C, the second curved liquid crystal alignment layer AL2C may be configured to form at least two domains: the first region R1 and the second region R2. The alignment direction of the second liquid crystal molecules LC2-1, LC2-2 are different from each other in the first region R1 and the second region R2. Meanwhile, the first curved liquid crystal alignment layer AL1C may be configured to form a single domain, in which the alignment directions of the first liquid crystal molecules LC1 are substantially the same across the area defined by the first region R1 and the second region R2.

The first region R1 and the second region R2, respectively, indicate the left region and the right region with respect to the virtual straight line (C-C') that passes through the peak of the first curved substrate 100C and the peak of the second curved substrate 200C. As used herein, the term 'peak' refers to any point on the curved line where the slope of the tangent at that point is substantially zero.

As shown in FIG. 3, the second curved liquid crystal alignment layer AL2C may be configured such that in the first region R1, the 2-$1^{st}$ liquid crystal molecules LC2-1 may be aligned in the first tilt direction, and the 2-$2^{nd}$ liquid crystal molecules LC2-2 may be aligned in the second tilt direction. The second curved liquid crystal alignment layer AL2C may be configured such that in the first region R1, at least two domains may be formed where the alignment direction of the 2-0 liquid crystal molecules LC2-1 is different from that of the 2-$2^{nd}$ liquid crystal molecules LC2-2. The first tilt direction may be approximately in a $-\alpha°$ direction based on the virtual straight line (C-C'), and the second tilt direction may be approximately in a $+\alpha°$ direction based on the virtual straight line (C-C'), wherein $\alpha$ is a positive real number.

The second curved liquid crystal alignment layer AL2C may be configured such that in the second region R2, the 2-$1^{st}$ liquid crystal molecules LC2-1 may be aligned in the first tilt direction $(-\alpha°)$, and the 2-$2^{nd}$ liquid crystal molecules LC2-2 may be aligned in the second tilt direction $(+\alpha°)$. The second curved liquid crystal alignment layer AL2C may be configured such that in the second region R2, at least two domains may be formed where the alignment direction of the 2-0 liquid crystal molecules LC2-1 is different from that of the 2-$2^{nd}$ liquid crystal molecules LC2-2.

On the other hand, the first curved liquid crystal alignment layer AL1C may be configured such that in the area defined by the first region R1, a single domain is formed where the first liquid crystal molecules LC1 are aligned in a third tilt direction, and also such that in the area defined by the second region R2, a single domain is formed where the first liquid crystal molecules LC1 are aligned in a fourth tilt direction. For example, the third tilt direction may be approximately in a $-\beta°$ direction based on the virtual straight line (C-C'), and the fourth tilt direction may be approximately in a $+\beta°$ direction based on the virtual straight line (C-C'), wherein $\beta$ is a positive real number.

In this way, in the first region R1 and the second region R2, a plurality of domains where the alignment directions of the liquid crystal molecules are different may be selectively formed on only the second curved liquid crystal alignment layer AL2C and the second curved liquid crystal alignment layer AL2C, thereby alleviating the generation of stains or dark areas attributable to the conflict between the alignment directions of the first liquid crystal molecules LC1 and the second liquid crystal molecules LC2-1, LC2-2.

The first curved liquid crystal alignment layer AL1C may include at least one vertical alignment functional group represented by Chemical Formulae 1 to 5 below.

Chemical Formula 1>

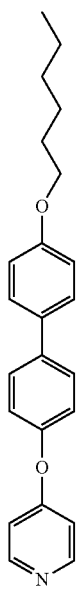

Chemical Formula 2>

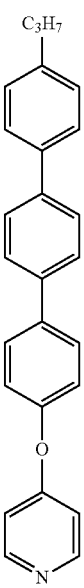

Chemical Formula 3

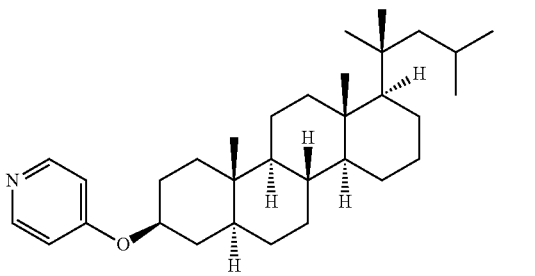

Chemical Formula 4

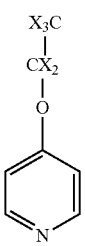

Chemical Formula 5

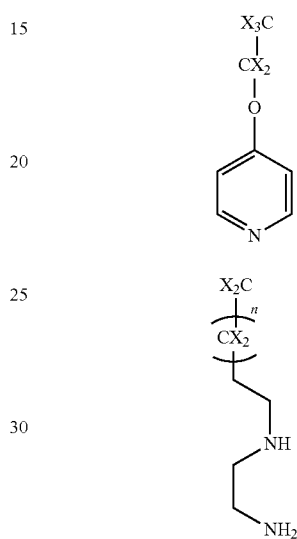

In Chemical Formulae 4 and 5, X may be H, F, Br, I, OH, $C_3H_7$, $NH_2$, or CN, and in Chemical Formula 5, n is a natural number of 1 to 20.

The vertical alignment functional group described below may be added in combination with the liquid crystals in the course of injecting the liquid crystals. The vertical alignment functional group is thereby linked to the common electrode 110C to thus vertically align the first liquid crystal molecules LC1, which are located under the common electrode 110C. Briefly, the vertical alignment functional groups allow the first liquid crystal molecules LC1 adjacent to the common electrode 110C to be substantially vertically aligned.

In addition to the vertical alignment functional group of Chemical Formulae 1 to 5, the exemplary curved liquid crystal display may further include at least one vertical alignment functional group represented by Chemical Formulae 6 to 19 below.

Chemical Formula 6

Chemical Formula 7

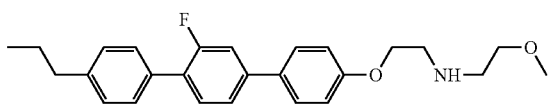

Chemical Formula 8

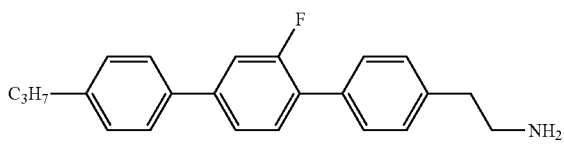

Chemical Formula 9

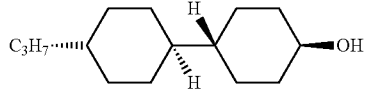

Chemical Formula 10

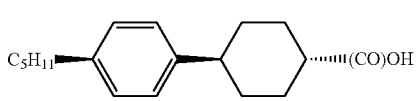

Chemical Formula 11

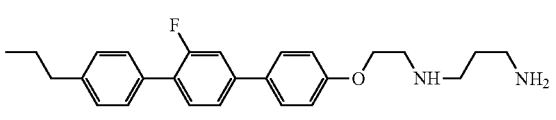

Chemical Formula 12

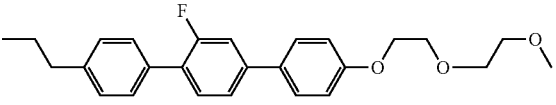

Chemical Formula 13

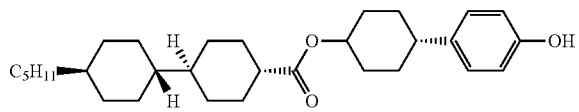

Chemical Formula 14

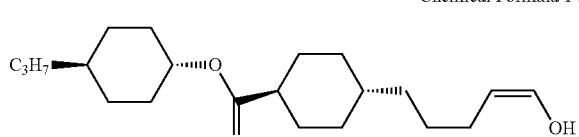

Chemical Formula 15

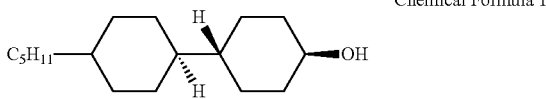

Chemical Formula 16

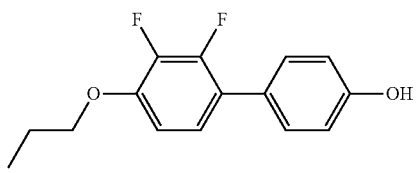

Chemical Formula 17

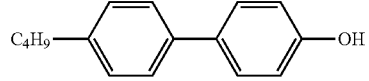

Chemical Formula 18

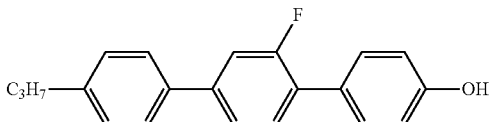

Chemical Formula 19

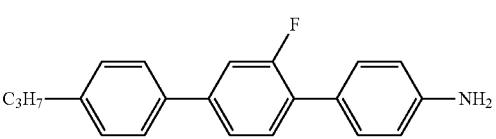

In an exemplary embodiment, the second curved liquid crystal alignment layer AL2C may include a polymerization initiator. In another exemplary embodiment, the first curved liquid crystal alignment layer AL1C may not include a polymerization initiator. The radical polymerization of a reactive mesogen, described further on in detail, may be promoted by the polymerization initiator contained in the second curved liquid crystal alignment layer AL2C. When ultraviolet (UV) light is radiated at the same time in which an electric field is applied, the second liquid crystal molecules LC2-1, LC2-2 of the second curved liquid crystal alignment layer AL2C may be arranged to have a predetermined pre-tilt on the surface of the second curved liquid crystal alignment layer AL2C, namely, on the 2-$2^{nd}$ curved liquid crystal alignment layer AL2-2C.

In contrast, the first liquid crystal molecules LC1 adjacent to the surface of the first curved liquid crystal alignment layer AL1C may not substantially achieve a pre-tilt, or may be vertically arranged, because the first curved liquid crystal alignment layer AL1C includes the vertical alignment functional group but does not contain a polymerization initiator thus preventing the radical polymerization of reactive mesogen. The second curved liquid crystal alignment layer AL2C may thus have a higher reactive mesogen content than the first curved liquid crystal alignment layer AL1C.

The polymerization initiator may be introduced to the side chain of polyimide in the second curved liquid crystal alignment layer AL2C. Thus, when the second curved liquid crystal alignment layer AL2C contains reactive mesogen or when liquid crystals containing reactive mesogen are injected, the polymerization of the reactive mesogen may be more actively carried out between the second curved liquid crystal alignment layer AL2C and the liquid crystals.

In an exemplary embodiment, the second curved liquid crystal alignment layer AL2C may be a vertical alignment type liquid crystal alignment layer including polyimide. The polyimide may have a main chain and one or more side chains bound to the main chain, and may be configured such that an imide group (—CONHCO—) is contained in the repeating unit of the main chain thereof, and also such that the side chain thereof includes at least one vertical alignment functional group. The vertical alignment functional group may be an alkyl group, a hydrocarbon derivative having an alkyl group substituted at the end thereof, a hydrocarbon derivative having a cycloalkyl group substituted at the end thereof, and a hydrocarbon derivative having an aromatic hydrocarbon substituted at the end thereof, wherein each of the foregoing groups may have, for example, from 6 to 60 carbon atoms.

The second curved liquid crystal alignment layer AL2C may include at least one repeating unit derived from a dianhydride represented by Chemical Formulae 21 to 23 below.

Chemical Formula 21

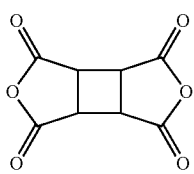

Chemical Formula 22

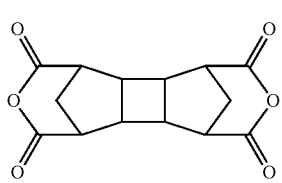

Chemical Formula 23

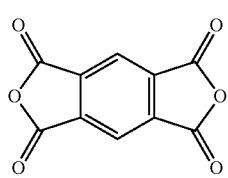

Also, the second curved liquid crystal alignment layer AL2C may further include at least one repeating unit derived from a diamine represented by Chemical Formulae 24 to 28 below, whereby liquid the crystals may be vertically aligned.

Chemical Formula 24

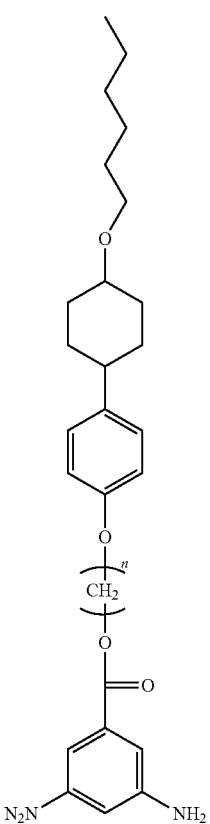

Chemical Formula 25

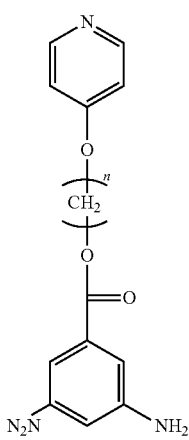

Chemical Formula 26

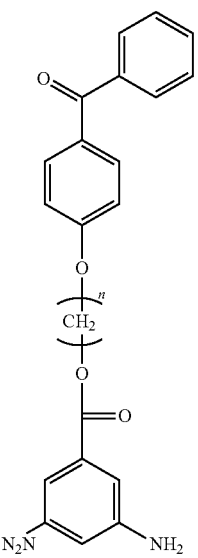

Chemical Formula 27

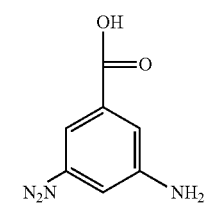

Chemical Formula 28

wherein, in Formulae 25 and 26, each n is independently a natural number of 1 to 20.

More specifically, the second curved liquid crystal alignment layer AL2C may include at least one repeating unit as represented by Chemical Formulae 29 and 30 below.

Chemical Formula 29
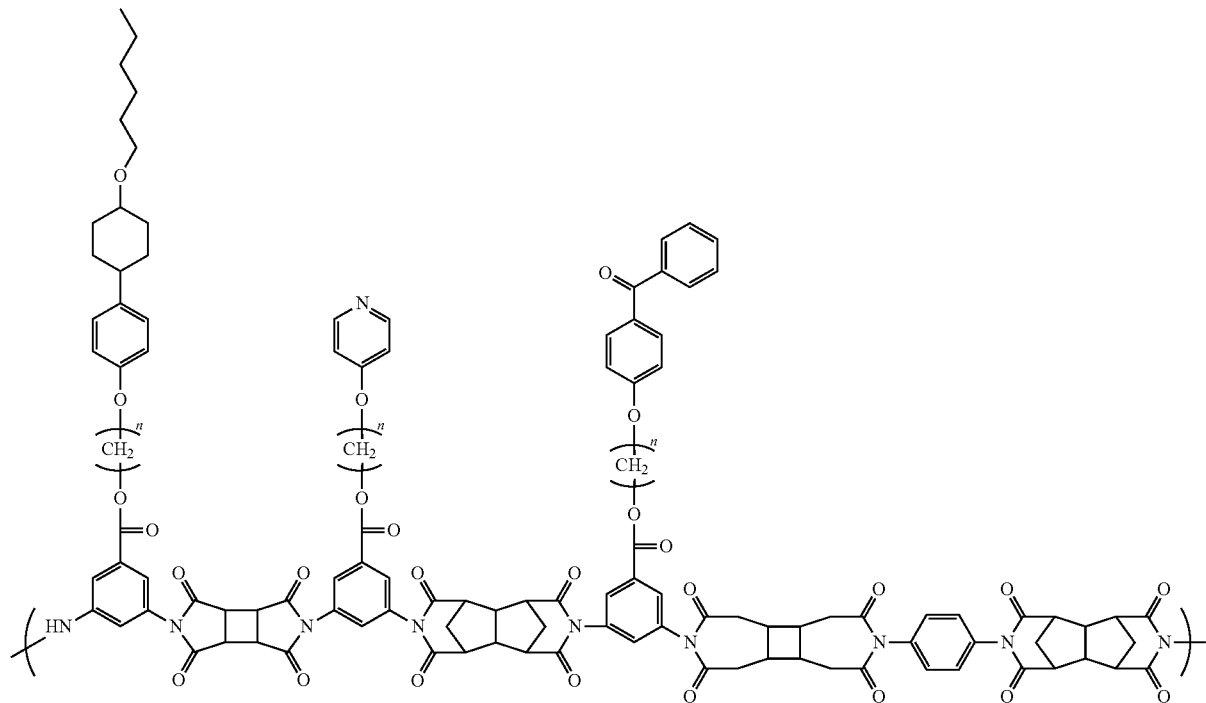
Chemical Formula 30
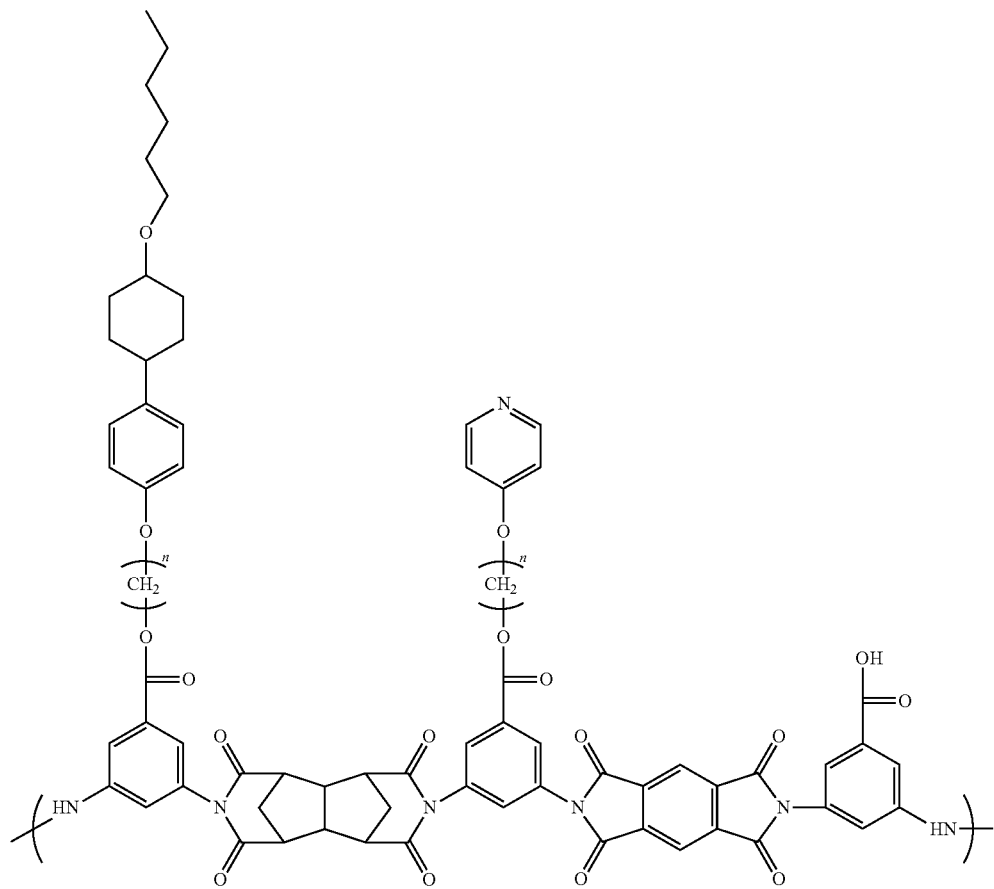

wherein in Chemical Formulae 29 and 30, each n is independently a natural number of 1 to 20.

The reactive mesogen may include, but is not limited to, at least one of the structures of Chemical Formulae 31 to 46 below.

Chemical Formula 31

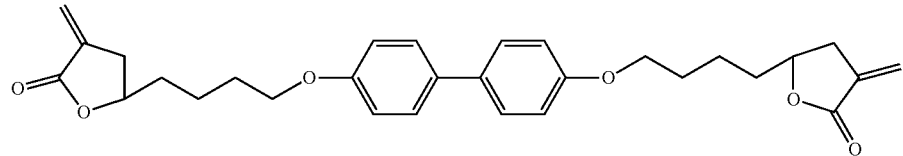

Chemical Formula 32

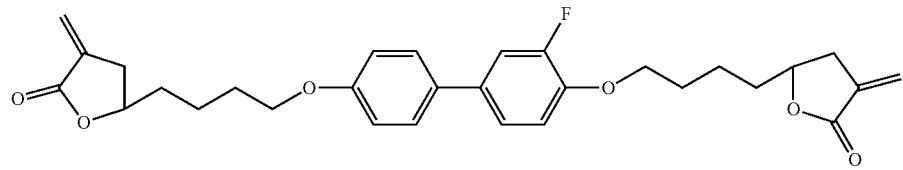

Chemical Formula 33

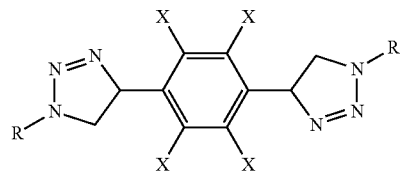

Chemical Formula 34

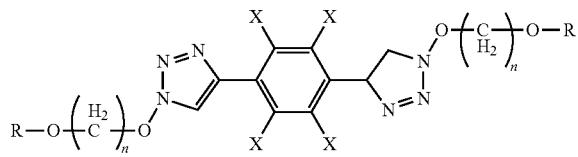

Chemical Formula 35

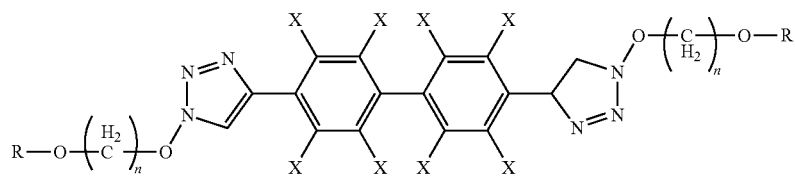

Chemical Formula 36

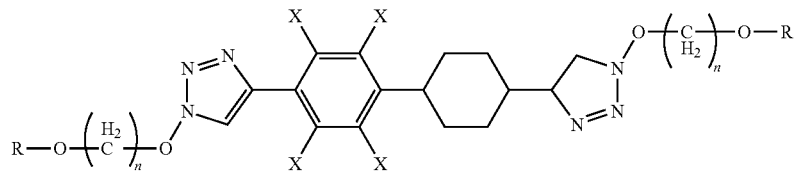

Chemical Formula 37

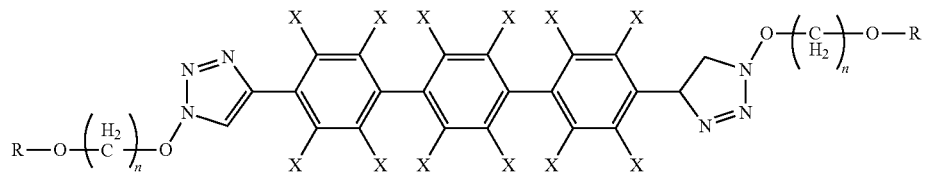

Chemical Formula 38

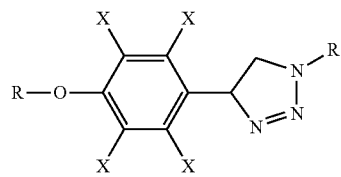

Chemical Formula 39

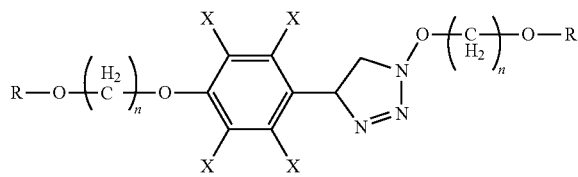

Chemical Formula 40

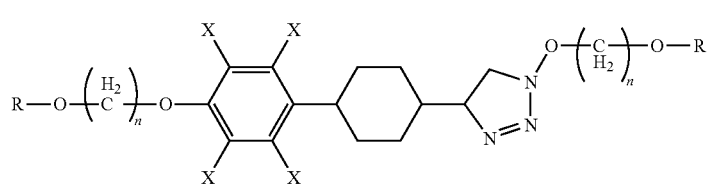

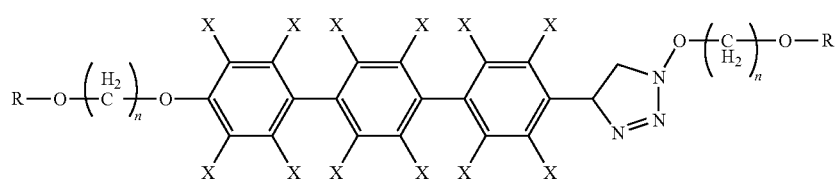

Chemical Formula 41

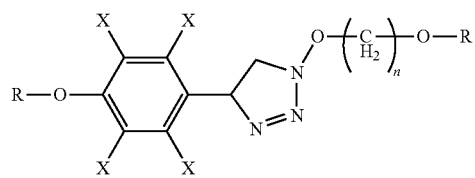

Chemical Formula 42

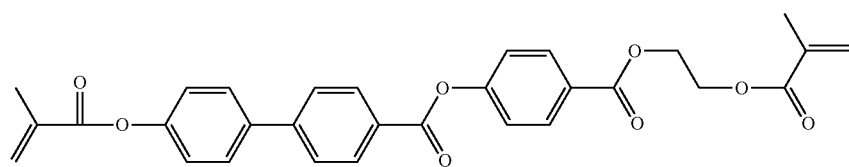

Chemical Formula 43

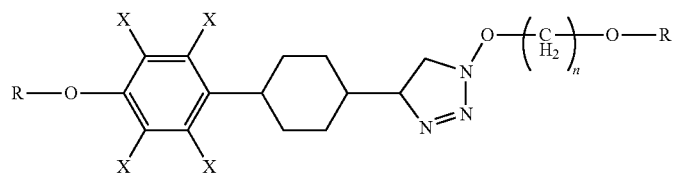

Chemical Formula 44

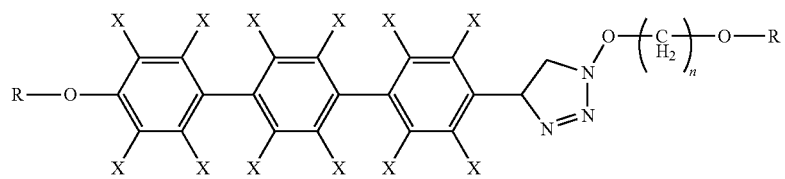

Chemical Formula 45

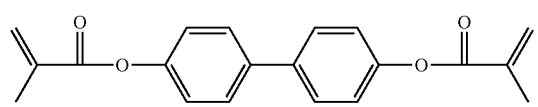

Chemical Formula 46

In Chemical Formulae 31 to 46, each X may independently be H, $CH_3$, $(CH_2)_nCH_3$, F, Br, I, OH, $C_3H_7$, $NH_2$ or CN, each n is independently a natural number of 1 to 20, and each R may independently be of the formulas below

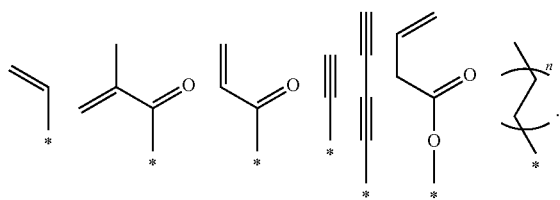

where n is a natural number of 1 to 20.

The second curved liquid crystal alignment layer AL2C may be provided in the form of a multilayer structure comprising a 2-1$^{st}$ curved liquid crystal alignment layer AL2-1C and a 2-2$^{nd}$ curved liquid crystal alignment layer AL2-2C. The 2-2$^{nd}$ curved liquid crystal alignment layer AL2-2C has a higher reactive mesogen content than the 2-0 curved liquid crystal alignment layer AL2-1C. The second curved liquid crystal alignment layer AL2C contains a polymerization initiator which facilitates the radical polymerization of the reactive mesogen. Thus, the 2-1$^{st}$ curved liquid crystal alignment layer AL2-1C composed of vertical alignment components forms one layer in the second curved liquid crystal alignment layer AL2C, and the 2-2$^{nd}$ curved liquid crystal alignment layer AL2-2C may be formed on the 2-1$^{st}$ curved liquid crystal alignment layer AL2-1C through the polymerization of the reactive mesogen.

The second liquid crystal molecules LC2-1, LC2-2, which are positioned on the 2-2$^{nd}$ curved liquid crystal alignment layer AL2-2C, may be arranged at a predetermined pre-tilt on the surface of the second curved liquid crystal alignment layer AL2C, namely, on the 2-2$^{nd}$ curved liquid crystal alignment layer AL2-2C.

The 2-2$^{nd}$ curved liquid crystal alignment layer AL2-2C may be at least partially formed on the surface of the 2-1$^{st}$ curved liquid crystal alignment layer AL2-1C.

In an exemplary embodiment, the 2-1$^{st}$ curved liquid crystal alignment layer AL2-1C may be a vertical alignment type liquid crystal alignment layer including polyimide having an imide group (—CONHCO—) in the repeating unit of the main chain thereof and a vertical alignment functional group in the side chain thereof. The 2-2$^{nd}$ curved liquid crystal alignment layer AL2-2C may comprise a polymer formed of reactive mesogens.

The 2-1$^{st}$ curved liquid crystal alignment layer AL2-1C may have a higher imide content than the 2-2$^{nd}$ curved liquid crystal alignment layer AL2-2C, and the 2-2$^{nd}$ curved liquid crystal alignment layer AL2-2C may have a higher reactive mesogen content than the 2-1$^{st}$ curved liquid crystal alignment layer AL2-1C.

FIGS. 4 to 9 are cross-sectional views schematically showing the process of manufacturing the curved liquid crystal display 500C according to an embodiment. As shown in FIGS. 4 to 9, the method of manufacturing the curved liquid crystal display 500C according to an embodiment is described below.

Figure 4:
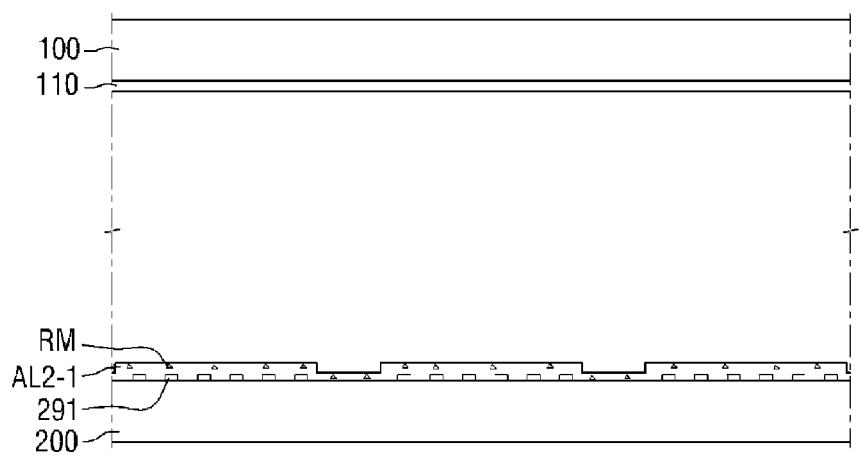
FIGS. 4 to 9 are cross-sectional views schematically showing an exemplary process of manufacturing a curved liquid crystal display.

With reference to FIG. 4, a first flat substrate 100 is disposed to face a second flat substrate 200 while a predetermined cell gap is maintained therebetween. For example, the second flat substrate 200 may be a thin film transistor substrate, and the first flat substrate 100 may be a color filter substrate.

A common electrode 110 may be disposed on the first flat substrate 100, and a first flat liquid crystal alignment layer AL1 (shown in FIGS. 5-9) may be disposed on the common electrode 110. The common electrode 110 may be formed of indium tin oxide, indium zinc oxide, indium oxide, zinc oxide, tin oxide, gallium oxide, titanium oxide, aluminum, silver, platinum, chromium, molybdenum, tantalum, niobium, zinc, magnesium, alloys thereof or laminate layers thereof. The common electrode 110 may be a patternless electrode having no slit pattern.

A pixel electrode 291 may be disposed on the second flat substrate 200, and a 2-1$^{st}$ flat liquid crystal alignment layer AL2-1 may be disposed on the pixel electrode 291. The 2-1$^{st}$ flat liquid crystal alignment layer AL2-1 may be formed on the surface of the second flat substrate 200. The 2-1$^{st}$ flat liquid crystal alignment layer AL2-1 may include a vertical alignment type polyimide and a polymerization initiator, and may further include reactive mesogen RM. The 2-1$^{st}$ flat liquid crystal alignment layer AL2-1 may be formed by applying a composite liquid crystal aligning agent comprising the vertical alignment type polyimide, a polymerization initiator and a reactive mesogen (RM) on the pixel electrode 291 and then drying it.

The pixel electrode 291 may be formed of indium tin oxide, indium zinc oxide, indium oxide, zinc oxide, tin oxide, gallium oxide, titanium oxide, aluminum, silver, platinum, chromium, molybdenum, tantalum, niobium, zinc, magnesium, alloys thereof or laminate layers thereof. The pixel electrode 291 may be a pattern electrode having a slit pattern, and a portion of the second flat substrate 200 may be exposed through the slit pattern of the pixel electrode 291.

The 2-1$^{st}$ second flat liquid crystal alignment layer AL2-1 may have a repeating unit as represented by Chemical Formulae 29 and 30.

Figure 5:
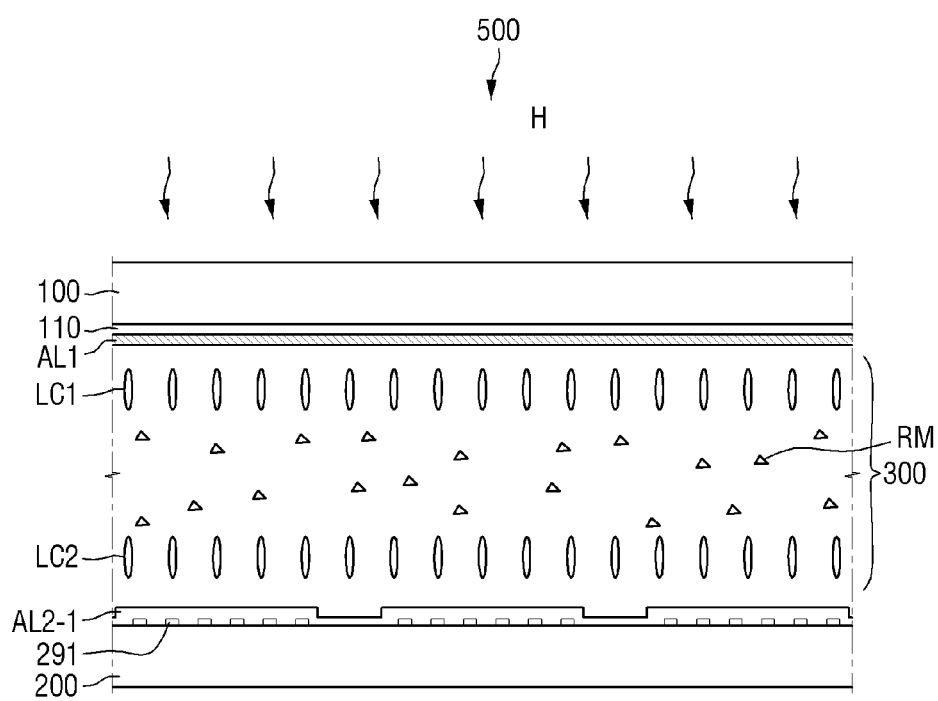
Figure 6:
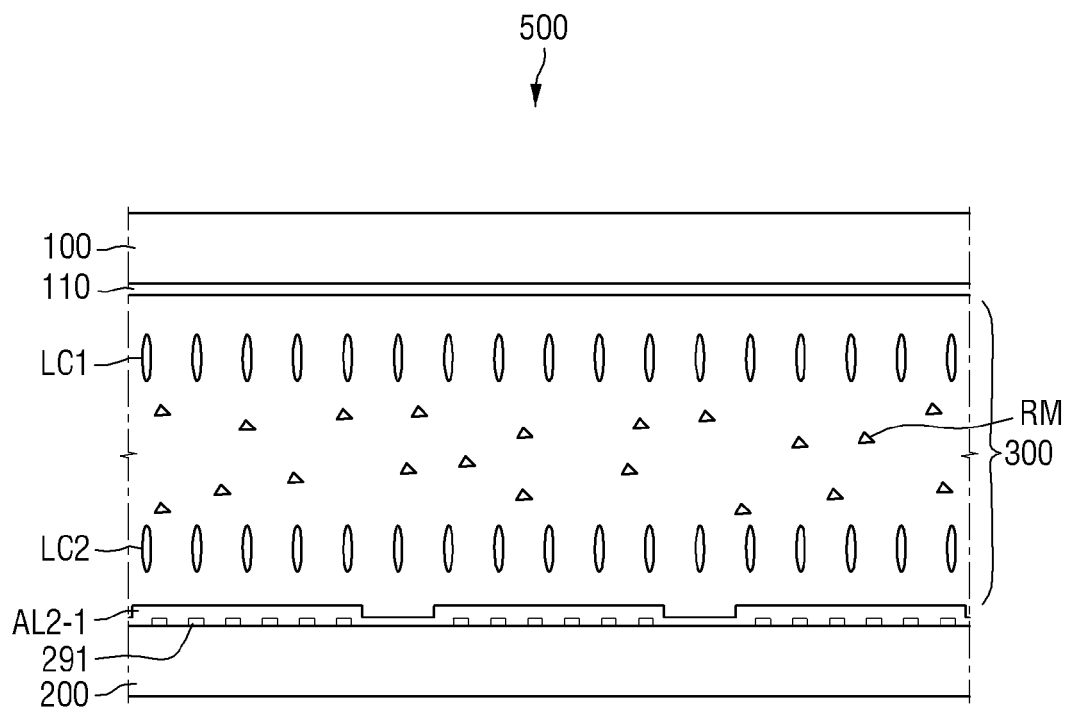

As shown in FIG. 5, a liquid crystal layer 300 is interposed between the first flat substrate 100 and the second flat substrate 200, which are disposed to face each other. The liquid crystal layer 300 may be formed in a manner such that a liquid crystal composition comprising liquid crystal molecules LC1, LC2 is injected between the first flat substrate 100 and the second flat substrate 200, or alternatively, is added in droplets. The liquid crystal layer 300 may include, in addition to the liquid crystal composition, one or more of the vertical alignment functional group as represented by Chemical Formulae 1 to 5 or the vertical alignment functional group as represented by Chemical Formulae 6 to 20. As shown in FIG. 6, when the 2-1$^{st}$ flat liquid crystal alignment layer AL2-1 contains no reactive mesogen, the liquid crystal composition containing reactive mesogen (RM) may be injected.

The vertical alignment functional groups, which are contained in the liquid crystal composition, are linked to the common electrode 110 after injection of the liquid crystal composition, thereby forming the first flat liquid crystal alignment layer AL1. Thereby, the first liquid crystal molecules LC1 adjacent to the first flat liquid crystal alignment layer LA1 may be vertically aligned.

Turning back to FIG. 5, heat H may be applied as needed in order to anneal either the first flat substrate 100 or the second flat substrate 200. The annealing step enables the first flat liquid crystal alignment layer ALL which is formed under the common electrode 110, to be more firmly adhered. Also, when reactive mesogen RM is included in the 2-1$^{st}$ flat liquid crystal alignment layer AL2-1, the reactive mesogen RM may be dissolved in the liquid crystal layer 300 by means of the annealing step. As shown in FIG. 6, when the liquid crystal composition containing the reactive mesogen RM is used, the annealing step may be omitted.

Individual liquid crystal molecules LC1, LC2 may have negative dielectric anisotropy. The liquid crystal molecules LC1, LC2 may be substantially vertically aligned relative to the first flat substrate 100 and the second flat substrate 200 under the initial condition where an electric field is not applied to the flat liquid crystal display 500. Specifically, respective vertical alignment functional groups of the first flat liquid crystal alignment layer AL1 and the 2-1$^{st}$ flat liquid crystal alignment layer AL2-1, enable the liquid crystal molecules LC1, LC2 to be substantially vertically aligned relative to the first flat substrate 100 and the second flat substrate 200 prior to applying an electric field to the flat liquid crystal display 500. The substantially vertical alignment means that the liquid crystal molecules LC1, LC2 are aligned in an angle range of, for example, about 87.5° to less than 90° relative to the first flat substrate 100 and the second flat substrate 200, respectively.

Figure 7:
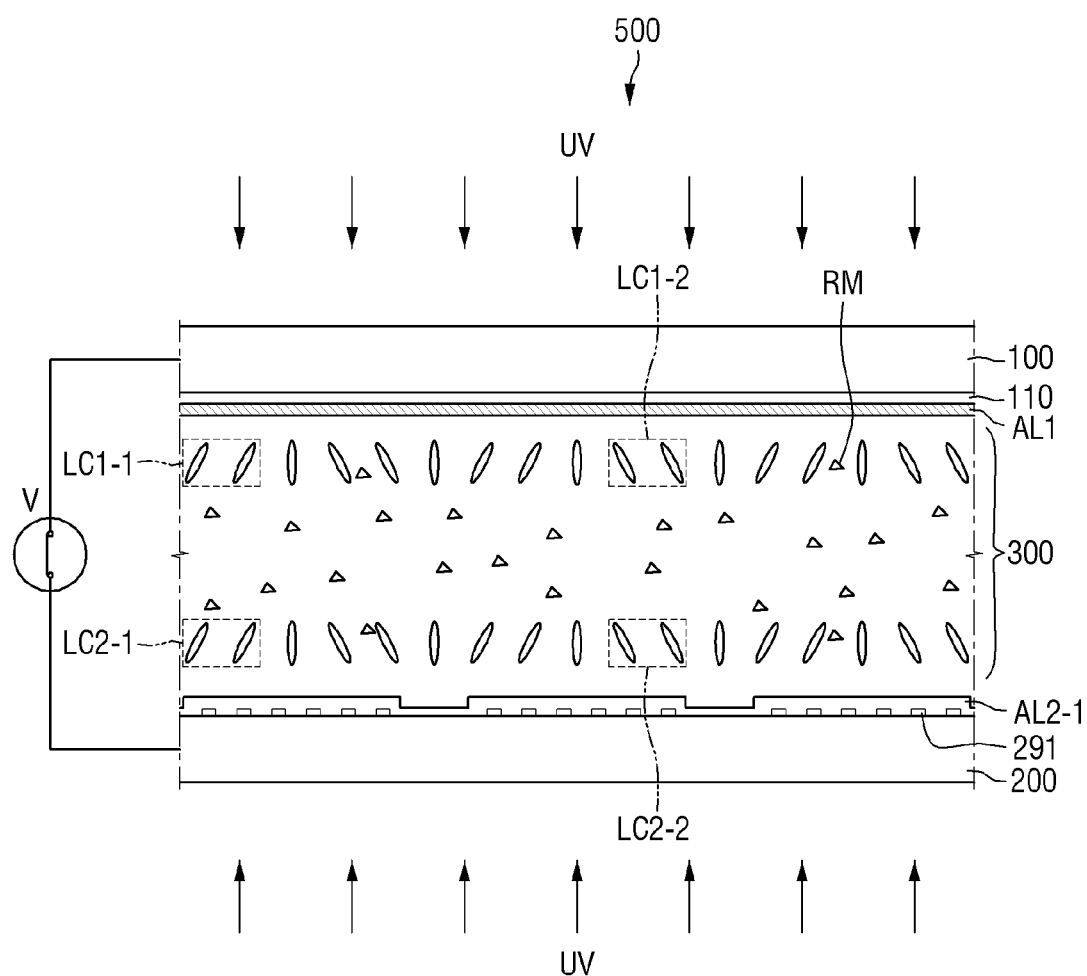

As shown in FIG. 7, when an electric field is applied to the flat liquid crystal display 500, the liquid crystal molecules LC1-1, LC1-2, LC2-1, and LC2-2 may be tilt-aligned in a direction perpendicular to the electric field formed between the common electrode 110 and the pixel electrode 291. Specifically, the 1-1$^{st}$ liquid crystal molecules LC1-1 and the 2-1$^{st}$ liquid crystal molecules LC2-1 may be aligned in the first tilt direction, and the 1-2$^{nd}$ liquid crystal molecules LC1-2 and the 2-2$^{nd}$ liquid crystal molecules LC2-2 may be aligned in the second tilt direction. Thereafter, when ultraviolet light UV is radiated onto the flat liquid crystal display 500, photopolymerization of the reactive mesogen RM contained in the 2-1$^{st}$ flat liquid crystal alignment layer AL2-1 is initiated, thus forming the 2-2$^{nd}$ flat liquid crystal alignment layer AL2-2. In contrast, the first flat liquid crystal alignment layer AL1 contains no polymerization initiator and includes only the vertical alignment functional group, so that the polymerization of reactive mesogen RM may not substantially occur.

As shown in FIG. 7, the reactive mesogen RM moves toward the 2-1$^{st}$ flat liquid crystal alignment layer AL2-1 to form the 2-2$^{nd}$ flat liquid crystal alignment layer AL2-2. The 2-2$^{nd}$ flat liquid crystal alignment layer AL2-2 may be formed of a polymer of reactive liquid crystal monomers RM, and the 2-2$^{nd}$ flat liquid crystal alignment layer AL2-2 may be formed on the 2-1$^{st}$ flat liquid crystal alignment layer AL2-1. As the 2-2$^{nd}$ flat liquid crystal alignment layer AL2-2 is formed, the amount of reactive mesogen RM in the liquid crystal layer 300 may be gradually decreased. The decrease in the amount of reactive mesogen RM in the liquid crystal layer 300 may occur as the reactive mesogen is used to form the 2-2$^{nd}$ flat liquid crystal alignment layer AL2-2.

The 2-2$^{nd}$ flat liquid crystal alignment layer AL2-2 may function to fix and/or stabilize the alignment directions of the 2-1$^{st}$ liquid crystal molecules LC2-1 and the 2-2$^{nd}$ liquid crystal molecules LC2-2. Thus, the tilt alignment of the 2-1$^{st}$ liquid crystal molecules LC2-1 and the 2-2$^{nd}$ liquid crystal molecules LC2-2, which are aligned on the surface of the 2-2$^{nd}$ flat liquid crystal alignment layer AL2-2, may be maintained as is even after the electric field applied to the flat liquid crystal display 500 is turned off. In contrast, when the electric field applied to the flat liquid crystal display 500 is removed (turned off), the first liquid crystal molecules LC1 are substantially vertically aligned as in the initial condition where no electric field is applied to the flat liquid crystal display 500.

Figure 8:
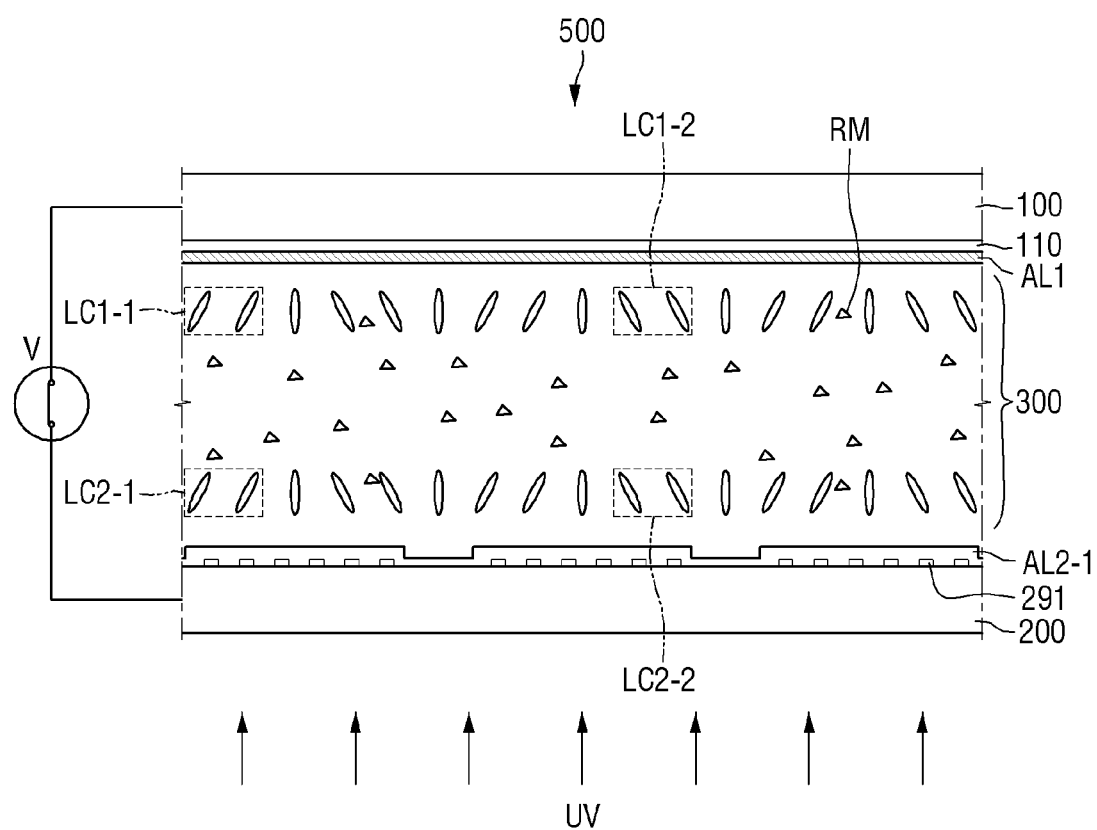
Figure 9:
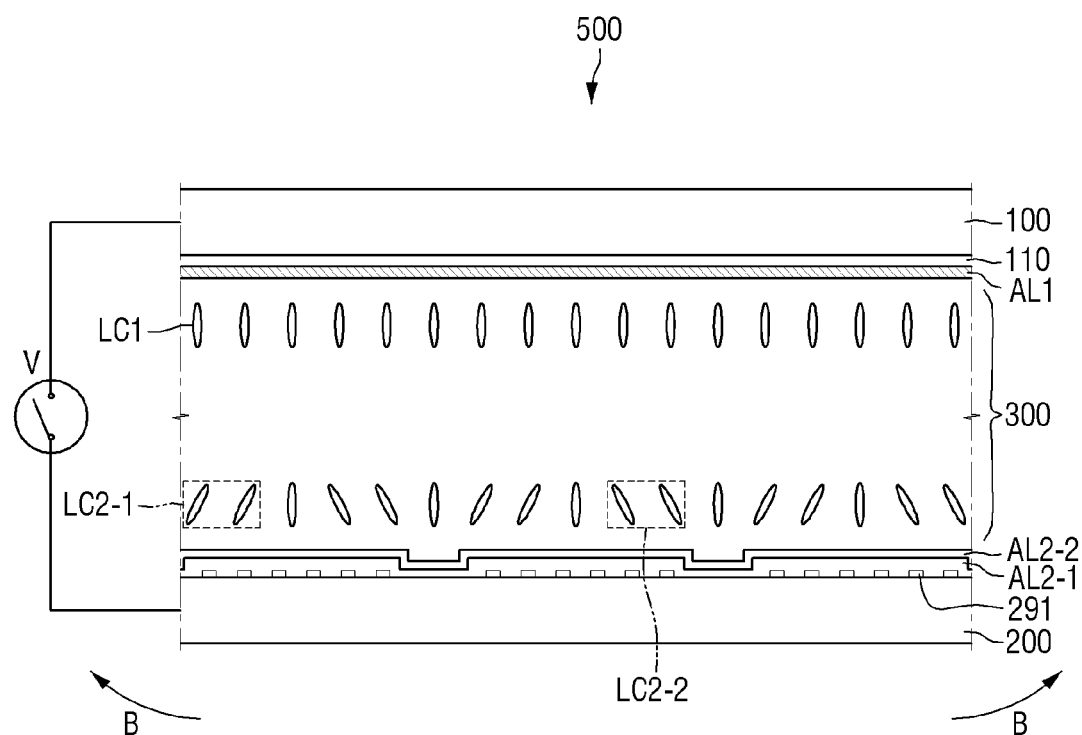

As shown in FIGS. 8 and 9, under the condition where no electric field is applied to the flat liquid crystal display 500, UV light may be radiated towards the flat liquid crystal display 500 to thereby remove any residual, unpolymerized reactive mesogen RM. Thereafter, the process of curving opposite ends of the flat liquid crystal display 500 (B) is performed, consequently manufacturing a curved liquid crystal display.

According to various embodiments described herein, the curved liquid crystal display can have increased light transmittance.

Also, the curved liquid crystal display can prevent the generation of unnecessary patterns or stains due to the use of the curved panel.

The effects of the present invention are not limited by the foregoing, and other various effects are anticipated herein.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A curved liquid crystal display, comprising:
   a first curved substrate;
   a second curved substrate facing the first curved substrate;
   a liquid crystal layer disposed between the first curved substrate and the second curved substrate;
   a first curved liquid crystal alignment layer disposed between the liquid crystal layer and the first curved substrate and including at least one vertical alignment functional group represented by Chemical Formulae 1 to 5 below; and
   a second curved liquid crystal alignment layer disposed between the liquid crystal layer and the second curved substrate;

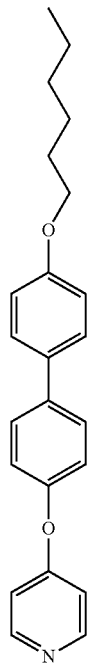

Chemical Formula 1

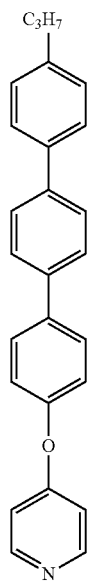

Chemical Formula 2

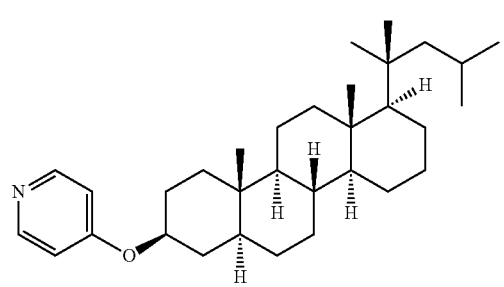

Chemical Formula 3

-continued

Chemical Formula 4

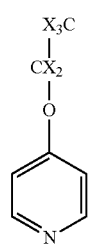

Chemical Formula 5

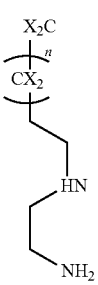

wherein, in Chemical Formulae 4 and 5, X is H, F, Br, I, OH, C₃H₇, NH₂, or CN, and in Chemical Formula 5, n is a natural number of 1 to 20.

2. The curved liquid crystal display of claim 1, wherein the second curved liquid crystal alignment layer comprises a polymerization initiator.

3. The curved liquid crystal display of claim 2, wherein the first curved liquid crystal alignment layer comprises no polymerization initiator.

4. The curved liquid crystal display of claim 1, wherein the first curved liquid crystal alignment layer further comprises at least one vertical alignment functional group represented by Chemical Formulae 6 to 19 below:

Chemical Formula 6

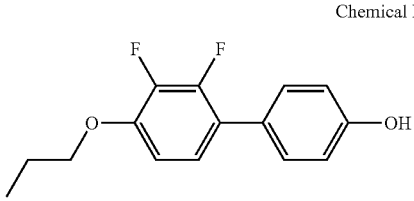

Chemical Formula 7

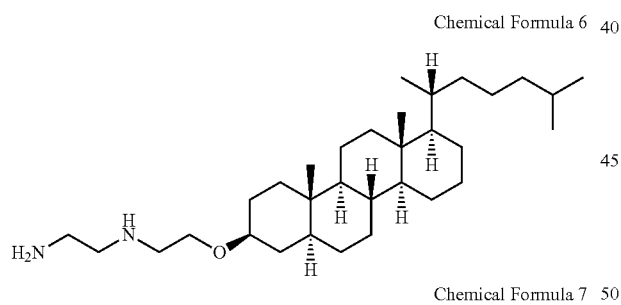

Chemical Formula 8

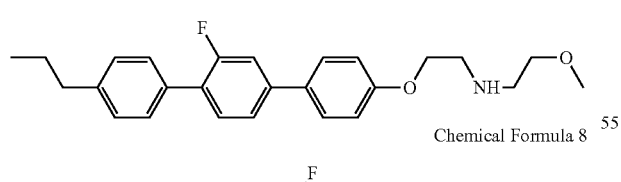

Chemical Formula 9

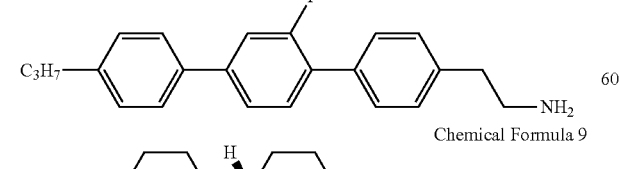

Chemical Formula 10

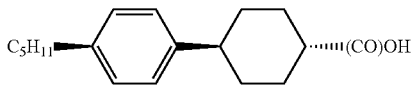

Chemical Formula 11

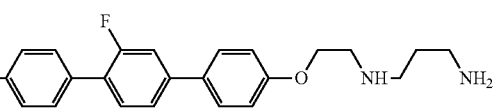

Chemical Formula 12

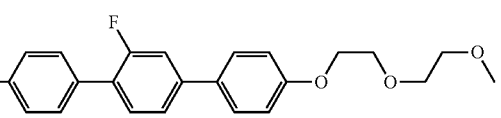

Chemical Formula 13

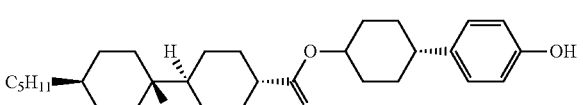

Chemical Formula 14

Chemical Formula 15

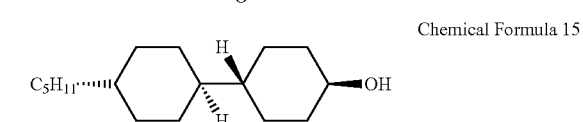

Chemical Formula 16

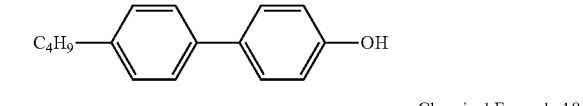

Chemical Formula 17

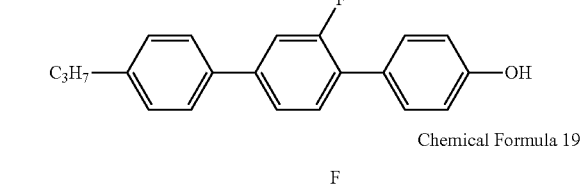

Chemical Formula 18

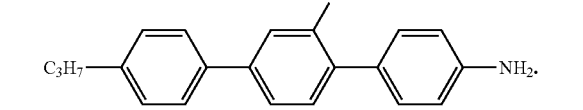

Chemical Formula 19

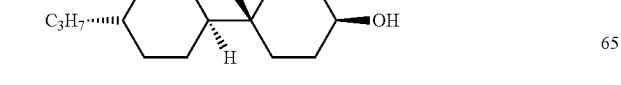

5. The curved liquid crystal display of claim 1, wherein the second curved liquid crystal alignment layer comprises a repeating unit as represented by Chemical Formulae 29 and 30 below:

Chemical Formula 29
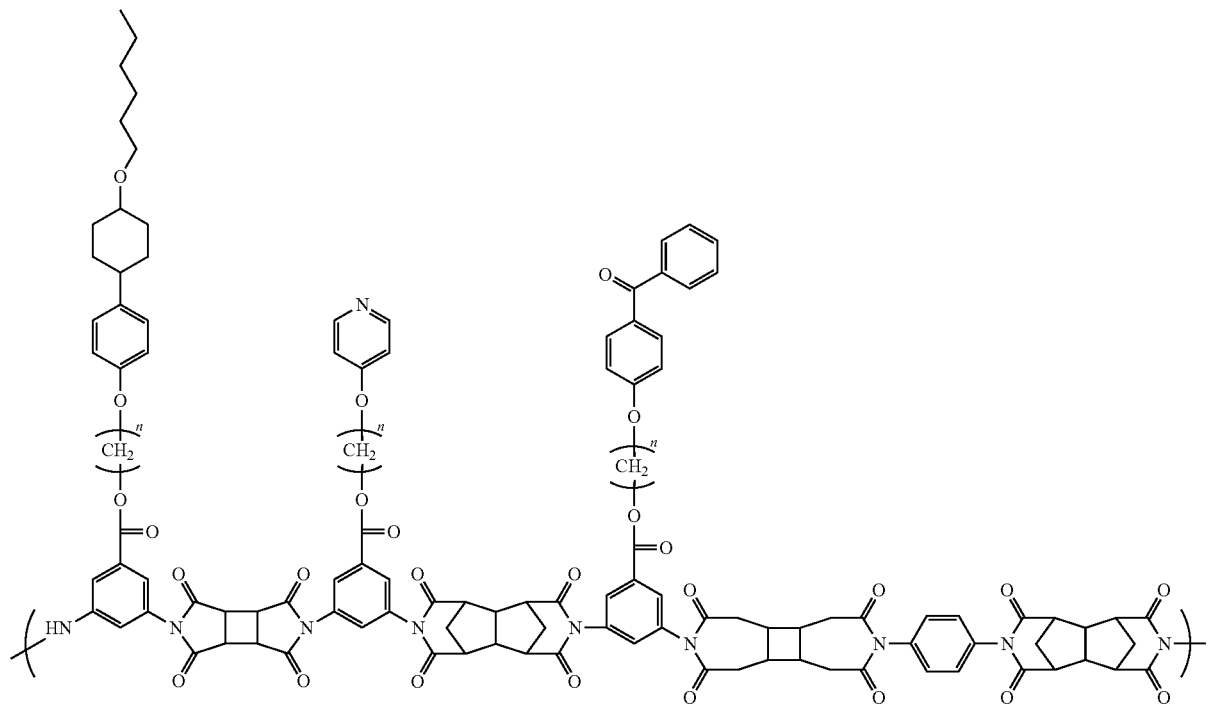
Chemical Formula 30
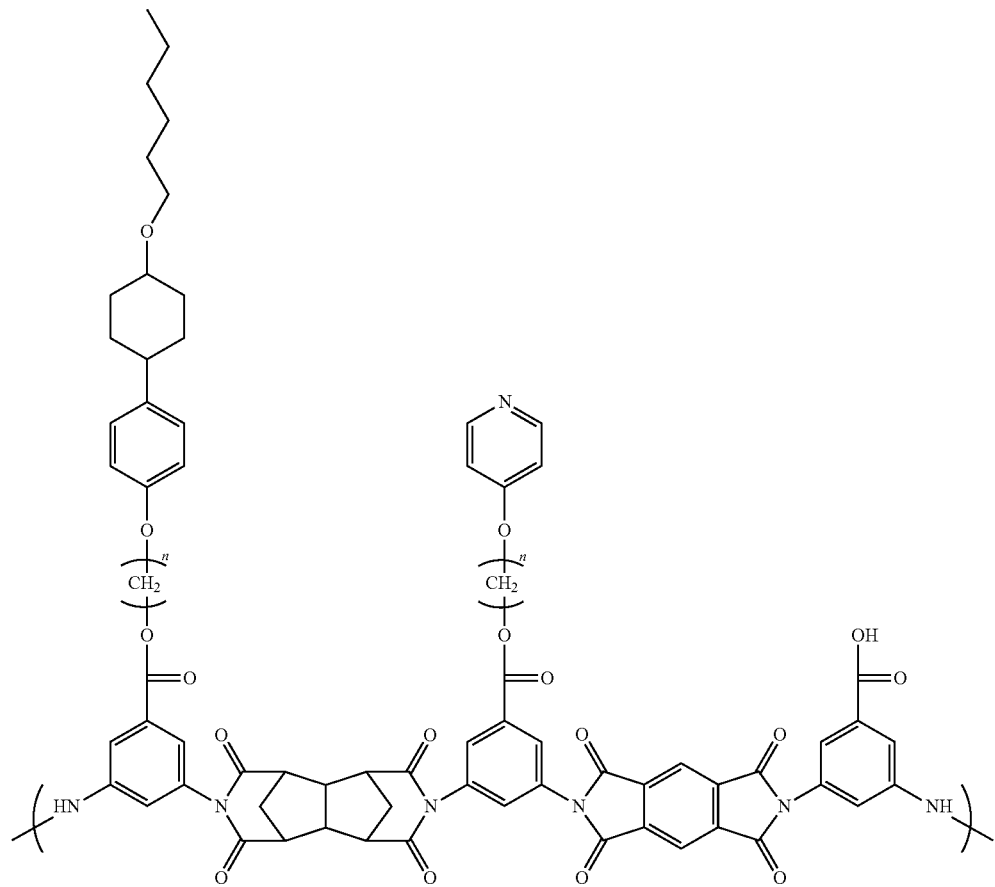

wherein in Chemical Formulae 29 and 30 each n is independently a natural number of 1 to 20.

6. The curved liquid crystal display of claim 2, wherein the second curved liquid crystal alignment layer comprises a reactive mesogen and has a higher reactive mesogen content than the first curved liquid crystal alignment layer.

7. The curved liquid crystal display of claim 2, wherein the second curved liquid crystal alignment layer has a multilayer structure comprising a 2-1$^{st}$ curved liquid crystal alignment layer and a 2-2$^{nd}$ curved liquid crystal alignment layer, wherein the 2-2$^{nd}$ curved liquid crystal alignment layer has higher reactive mesogen content than the 2-1$^{st}$ curved liquid crystal alignment layer.

8. The curved liquid crystal display of claim 1, wherein the liquid crystal layer comprises a first liquid crystal molecule having negative dielectric anisotropy aligned on a surface of the first curved liquid crystal alignment layer, and a second liquid crystal molecule aligned on a surface of the second curved liquid crystal alignment layer, and the first liquid crystal molecule is vertically aligned compared to the second liquid crystal molecule when an electric field is not applied.

9. The curved liquid crystal display of claim 1, further comprising:
a patternless electrode disposed between the first curved substrate and the first curved liquid crystal alignment layer and having no slit pattern; and
a pattern electrode disposed between the second curved liquid crystal alignment layer and the second curved substrate and having a slit pattern.

10. A method of manufacturing a curved liquid crystal display, comprising:
preparing a first flat substrate and a second flat substrate facing each other;
forming a second flat liquid crystal alignment layer on a surface of the second flat substrate that faces the first flat substrate;
injecting a liquid crystal between the first flat substrate and the second flat substrate;
radiating ultraviolet (UV) light toward at least one of the first flat substrate and the second flat substrate when an electric field is applied; and
curving the first flat substrate and the second flat substrate,
wherein the liquid crystal layer comprises at least one vertical alignment functional group represented by Chemical Formulae 1 to 5 below:

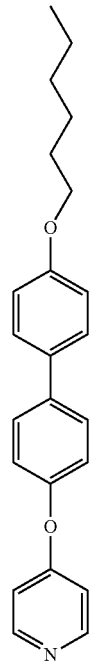

Chemical Formula 1

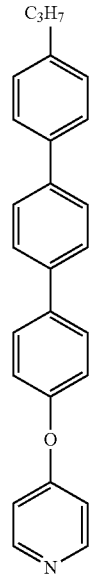

Chemical Formula 2

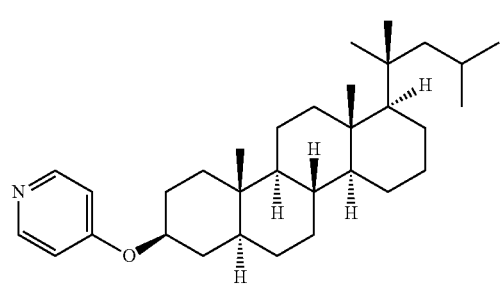

Chemical Formula 3

Chemical Formula 4

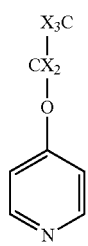

Chemical Formula 5

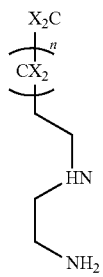

wherein, in Chemical Formulae 4 and 5, X is H, F, Br, I, OH, C₃H₇, NH₂, or CN, and in Chemical Formula 5, n is a natural number of 1 to 20.

11. The method of claim 10, wherein the liquid crystal layer further comprises at least one vertical alignment functional group represented by Chemical Formulae 6 to 19 below:

Chemical Formula 6

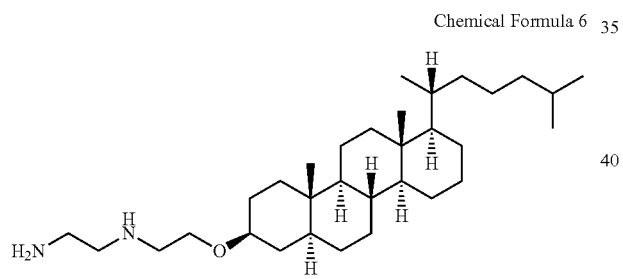

Chemical Formula 7

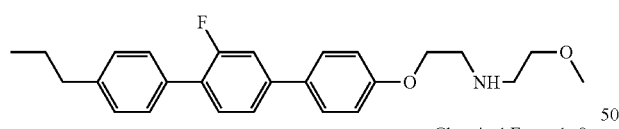

Chemical Formula 8

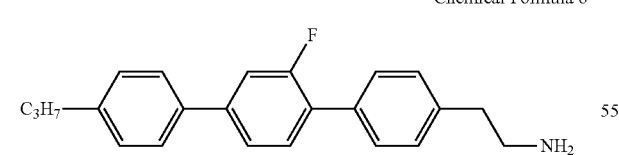

Chemical Formula 9

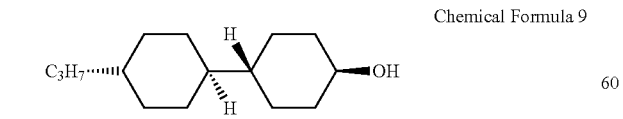

Chemical Formula 10

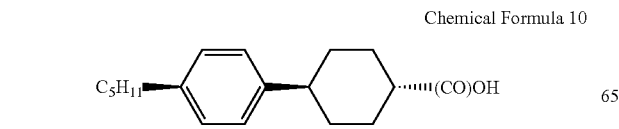

Chemical Formula 11

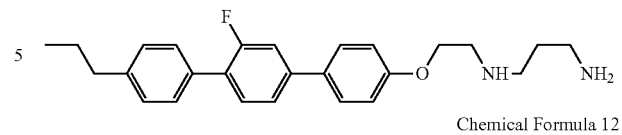

Chemical Formula 12

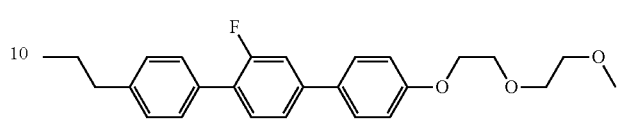

Chemical Formula 13

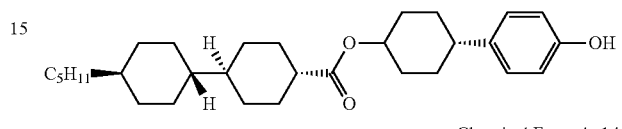

Chemical Formula 14

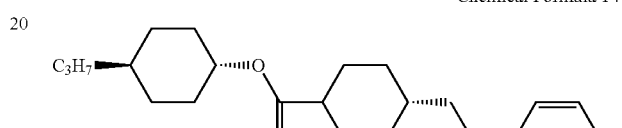

Chemical Formula 15

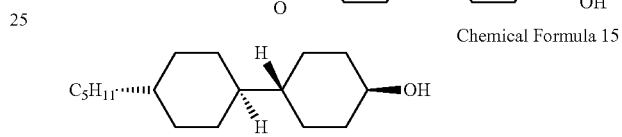

Chemical Formula 16

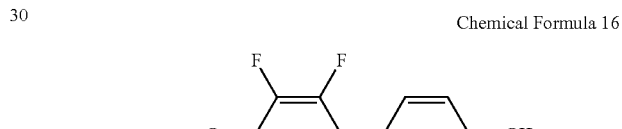

Chemical Formula 17

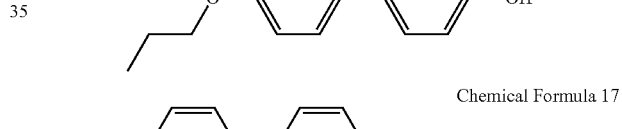

<Chemical Formula 18

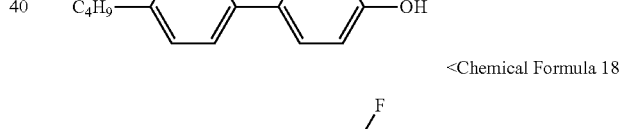

<Chemical Formula 19

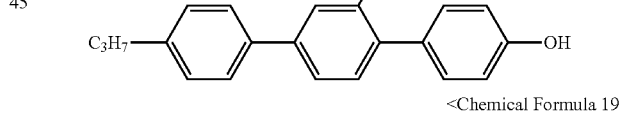

12. The method of claim 10, wherein in the injecting of the liquid crystal, the vertical alignment functional group provides a first flat liquid crystal alignment layer on a surface of the first flat substrate that faces the second flat substrate.

13. The method of claim 10, wherein the second flat liquid crystal alignment layer contains a polymerization initiator.

14. The method of claim 10, wherein the second flat liquid crystal alignment layer comprises a repeating unit as represented by Chemical Formulae 29 and 30 below:

Chemical Formula 29
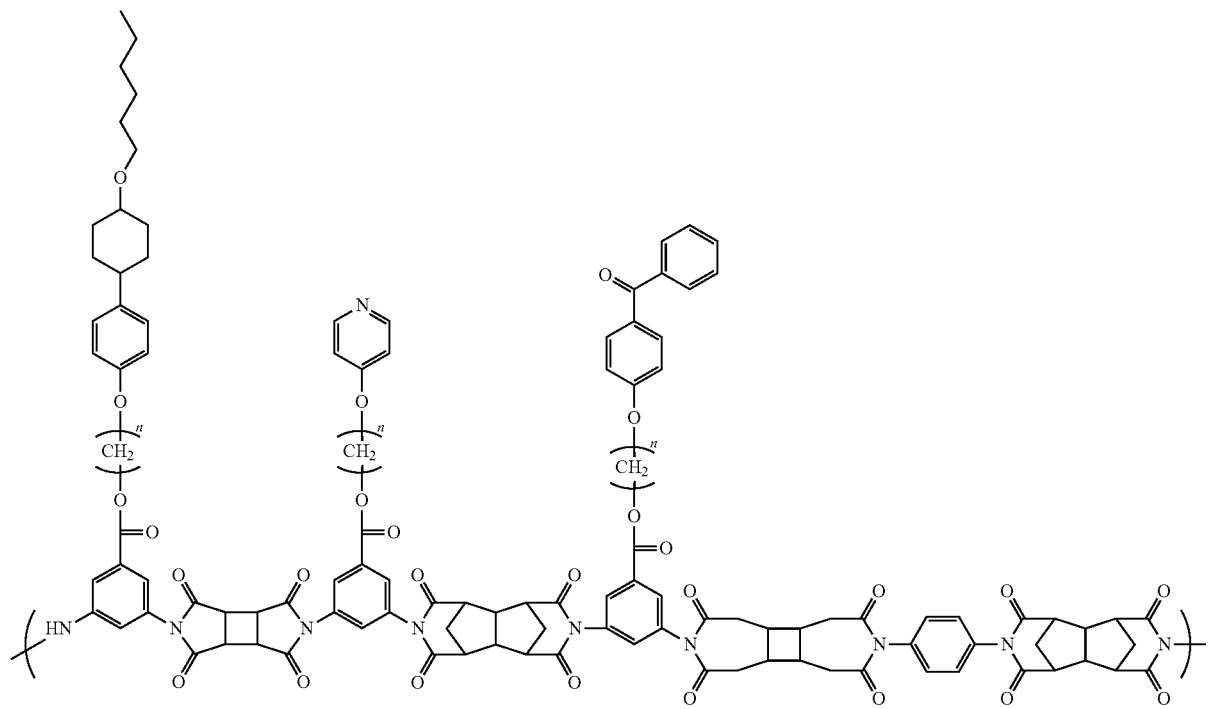
<Chemical Formula 30>
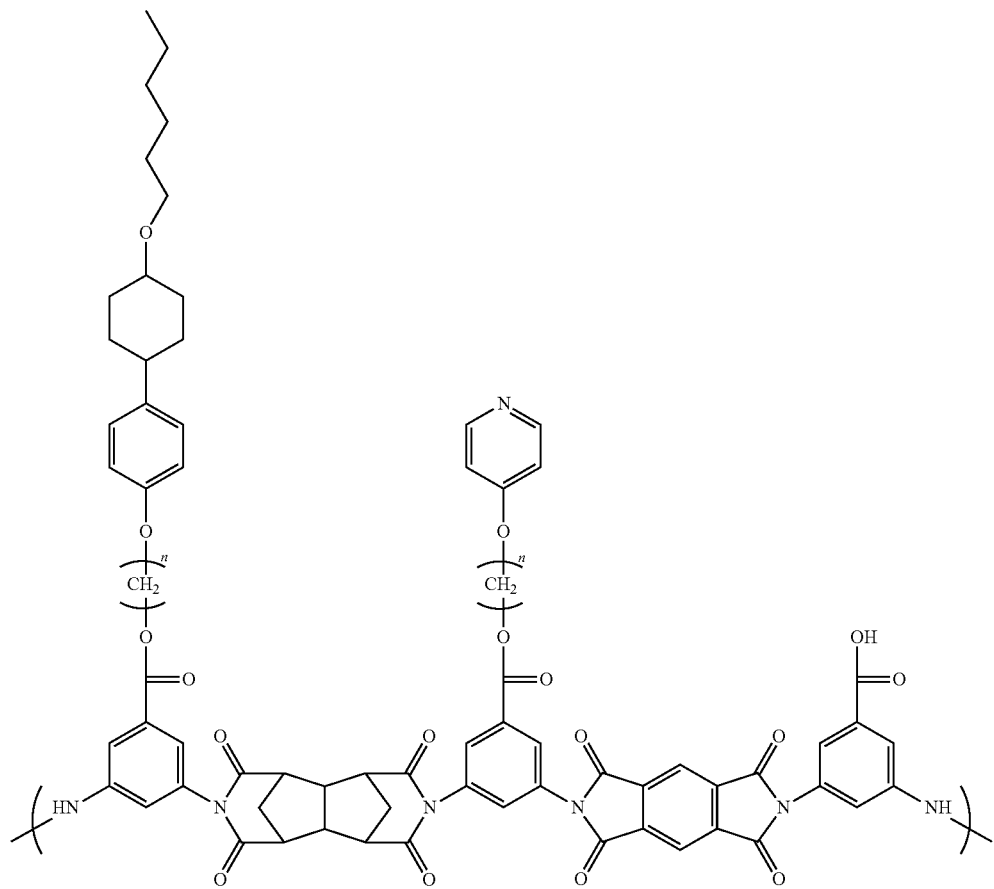

wherein in Chemical Formulae 29 and 30 each n is independently a natural number of 1 to 20.

15. The method of claim 10, wherein at least one of the liquid crystal layer and the second flat liquid crystal alignment layer further comprises a reactive mesogen.

16. The method of claim 10, wherein in the radiating the UV light, the second flat liquid crystal alignment layer is formed into a multilayer structure comprising a 2-$1^{st}$ flat liquid crystal alignment layer and a 2-$2^{nd}$ flat liquid crystal alignment layer having a higher reactive mesogen content than the 2-$1^{st}$ flat liquid crystal alignment layer.

17. The method of claim 10, wherein the liquid crystal layer comprises a first liquid crystal molecule having negative dielectric anisotropy aligned on a surface of the first flat liquid crystal alignment layer, and a second liquid crystal molecule aligned on a surface of the second flat liquid crystal alignment layer, and the first liquid crystal molecule is vertically aligned compared to the second liquid crystal molecule when the applied electric field is removed after the radiating the UV light.

18. The method of claim 10, further comprising:
forming a patternless electrode disposed between the first flat substrate and the first flat liquid crystal alignment layer, the patternless electrode having no slit pattern; and
forming a pattern electrode disposed between the second flat liquid crystal alignment layer and the second flat substrate, the pattern electrode having a slit pattern.

19. The method of claim 10, further comprising radiating fluorescent UV light after the radiating of the UV light.

20. The method of claim 10, further comprising annealing at least one of the first flat substrate and the second flat substrate using heating after the injecting of the liquid crystal.

* * * * *